(12) United States Patent
Zhang et al.

(10) Patent No.: US 11,581,673 B2
(45) Date of Patent: Feb. 14, 2023

(54) CARD HOLDER AND MOBILE TERMINAL

(71) Applicant: HUAWEI TECHNOLOGIES CO., LTD., Shenzhen (CN)

(72) Inventors: Shihao Zhang, Shanghai (CN); Qiliang Wang, Shanghai (CN); Gaobing Lei, Shanghai (CN); Tien Chieh Su, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/969,627

(22) PCT Filed: Feb. 13, 2018

(86) PCT No.: PCT/CN2018/076770
§ 371 (c)(1),
(2) Date: Aug. 13, 2020

(87) PCT Pub. No.: WO2019/157676
PCT Pub. Date: Aug. 22, 2019

(65) Prior Publication Data
US 2020/0403341 A1    Dec. 24, 2020

(51) Int. Cl.
*H01R 12/72* (2011.01)
*H01R 12/71* (2011.01)
(Continued)

(52) U.S. Cl.
CPC ......... *H01R 12/721* (2013.01); *H01R 12/714* (2013.01); *H01R 13/113* (2013.01);
(Continued)

(58) Field of Classification Search
CPC ...... H01R 27/00; H01R 31/06; H01R 23/682; H01R 23/7005; H01R 12/721;
(Continued)

(56) References Cited

U.S. PATENT DOCUMENTS 5,586,890 A * 12/1996 Braun .................. G06K 7/0021
439/66
6,035,216 A    3/2000 Cheng et al.
(Continued)

FOREIGN PATENT DOCUMENTS

CN    2888672 Y    4/2007
CN    102655306 A    9/2012
(Continued)

*Primary Examiner* — Gary F Paumen
(74) *Attorney, Agent, or Firm* — Rimon PC

(57) ABSTRACT

A card holder for use inside an electronic device is provided. The card holder includes a holder body and a plurality of electrical connectors. The holder body is disposed with a card slot matching a nano SIM card. The card slot is configured to accommodate the nano SIM card or a memory card having a same appearance or shape as the nano SIM card. At least some of the plurality of electrical connectors are first electrical connectors whose positions match the positions of electrical contact points in the nano SIM card. The first electrical connector is configured to electrically connect to the nano SIM card or the memory card accommodated in the card slot. The plurality of electrical connectors are configured to electrically connect to the memory card.

13 Claims, 12 Drawing Sheets

(51) Int. Cl.
*H01R 13/11* (2006.01)
*H01R 13/514* (2006.01)
*H04B 1/3816* (2015.01)
*H01R 13/633* (2006.01)

(52) U.S. Cl.
CPC ......... *H01R 13/514* (2013.01); *H01R 13/633* (2013.01); *H04B 1/3816* (2013.01)

(58) Field of Classification Search
CPC .. H01R 12/714; H01R 13/113; H01R 13/514; H01R 13/633; H04B 1/3816
USPC ......................................... 439/630, 218, 326
See application file for complete search history.

(56) References Cited

U.S. PATENT DOCUMENTS

| | | | |
|---|---|---|---|
| 6,062,887 A | 5/2000 | Schuster et al. | |
| 7,578,446 B2* | 8/2009 | Yen | G06K 19/077 40/124.06 |
| 9,004,950 B2* | 4/2015 | Nakamura | G06K 19/07743 361/772 |
| 9,214,772 B2* | 12/2015 | Liu | H01R 12/721 |
| 9,219,320 B2 | 12/2015 | Xiao et al. | |
| 11,132,665 B2* | 9/2021 | Dolcino | G06Q 20/409 |
| 2013/0225003 A1 | 8/2013 | Liu | |
| 2013/0235534 A1* | 9/2013 | Chang | G06K 13/0831 248/298.1 |
| 2013/0252470 A1* | 9/2013 | Lin | H05K 5/0282 439/630 |
| 2015/0079847 A1 | 3/2015 | Liu et al. | |
| 2017/0324177 A1* | 11/2017 | Lempiainen | H01R 13/642 |
| 2019/0392422 A1* | 12/2019 | Yim | G06Q 20/409 |

FOREIGN PATENT DOCUMENTS

| | | | | |
|---|---|---|---|---|
| CN | 103367951 A | | 10/2013 | |
| CN | 203326240 U | | 12/2013 | |
| CN | 203481567 U | | 3/2014 | |
| CN | 103730744 A | | 4/2014 | |
| CN | 204012075 U | * | 12/2014 | ............. H01R 27/00 |
| CN | 204012075 U | | 12/2014 | |
| CN | 205069929 U | * | 3/2016 | ............. H04M 1/02 |
| CN | 205069929 U | | 3/2016 | |
| CN | 106127285 A | | 11/2016 | |
| EP | 2858182 B1 | | 3/2017 | |
| JP | 2015026513 A | * | 2/2015 | ........... H01R 12/714 |
| JP | 2015026513 A | | 2/2015 | |
| KR | 20150110423 A | * | 10/2015 | ........... H01R 12/714 |
| KR | 20160053135 A | | 5/2016 | |
| KR | 20170031209 A | * | 3/2017 | ............. G06K 13/08 |
| WO | 2007025758 A1 | | 3/2007 | |

* cited by examiner

CARD HOLDER AND MOBILE TERMINAL

CROSS-REFERENCE TO RELATED APPLICATIONS

This application is a National Stage of International Application No. PCT/CN2018/076770, filed on Feb. 13, 2018, which is hereby incorporated by reference in its entirety.

TECHNICAL FIELD

This application relates to the field of mobile terminals, and in particular, to a card holder and a mobile terminal.

BACKGROUND

A micro SD card, also referred to as a TF card (Trans flash Card), is a memory card standard that can be widely applied to portable apparatuses such as mobile phones or personal digital assistants (PDA), to implement data storage and expansion of the portable apparatuses, and has advantages of portability, a simple operation, and a large storage capacity.

Currently, to meet a use requirement of a user, for a mobile terminal such as a mobile phone, a multi-functional card holder is usually used in the mobile terminal, a subscriber identity module (Subscriber Identification Module, SIM) card or a micro SIM (Micro SIM) card can be inserted into the card holder, and the micro SD card can be inserted into a card slot of the card holder. In this way, the mobile terminal can implement a plurality of functions such as user identification or data expansion by using one card holder.

However, as a mobile terminal is continuously miniaturized and portable, a nano SIM card needs to be used to save an inner space of the mobile terminal. In this case, a data expansion function cannot be implemented by inserting a micro SD card into a card holder for accommodating the nano SIM card.

SUMMARY

This application provides a card holder and a mobile terminal, to implement a data expansion function by using a card holder capable of accommodating a nano SIM card.

According to a first aspect, this application provides a card holder, including a holder body and a plurality of electrical connectors. The holder body is disposed with a card slot matching a nano SIM card. The card slot is configured to accommodate the nano SIM card or a memory card having a same appearance as the nano SIM card. At least some of the plurality of electrical connectors are first electrical connectors whose positions match positions of electrical contact points in the nano SIM card, and the first electrical connector is configured to electrically connect to the nano SIM card or the memory card accommodated in the card slot. The plurality of electrical connectors are all configured to electrically connect to the memory card. In this way, the card holder can be configured to accommodate the nano SIM card, and the card holder can also use the same card slot to accommodate the memory card having a shape similar to that of the nano SIM card, to implement data expansion and data transmission. The card holder has relatively good expandability.

Optionally, all the electrical connectors are first electrical connectors whose positions match the positions of the electrical contact points in the nano SIM card.

Optionally, at least two first electrical connectors match a position of a same electrical contact point. In this way, the electrical connector can be effectively reused, thereby simplifying a structure of the card holder.

Optionally, the at least two first electrical connectors correspond to different contact points in the memory card. In this way, the first electrical connectors can be in a one-to-one correspondence with the contact points in the memory card, to ensure that the card holder is correspondingly connected to the memory card.

Optionally, the plurality of electrical connectors include at least two electrical connector assemblies, and each electrical connector assembly includes at least two first electrical connectors matching a position of a same electrical contact point. In this way, the first electrical connectors can be correspondingly connected to six electrical contact points in the nano SIM card, and the first electrical connectors can be correspondingly connected to the contact points in the memory card.

Optionally, each electrical connector assembly includes two first electrical connectors matching a position of a same electrical contact point.

Optionally, the at least two electrical connector assemblies include a first electrical connector assembly and a second electrical connector assembly; each first electrical connector in the first electrical connector assembly matches a position of a VCC contact point in the nano SIM card; and each first electrical connector in the second electrical connector assembly matches a position of a GND contact point in the nano SIM card. In this way, when the card holder is connected to the nano SIM card, the first electrical connectors in the first electrical connector assembly or the second electrical connector assembly are all connected to contact points capable of providing a constant power supply signal, so that a connection status of the contact point and the first electrical connector is easily detected, to identify a type of a card inserted into the card holder. In addition, a common electrical contact point connected to two or more first electrical connectors is an electrical contact point for power supplying in the nano SIM card. The electrical contact point provides only a stable power supply without transmitting a changed data signal, so that even if different first electrical connectors are connected to a same common electrical contact point, reading and data transmission of the nano SIM card are not affected.

Optionally, the first electrical connectors in the electrical connector assemblies are arranged in different manners; and/or each electrical connector assembly has a first electrical connector whose shape is different from a shape of a first electrical connector outside the electrical connector assembly. In this way, a relatively large quantity of first electrical connectors can be arranged in a limited space, thereby avoiding accidental contact between the first electrical connector and the contact point or the electrical contact point.

Optionally, the plurality of electrical connectors include a second electrical connector, and a position of the second electrical connector does not correspond to a position of any electrical contact point in the nano SIM card.

Optionally, the second electrical connector is located in a projection area of the nano SIM card in a direction perpendicular to a card face. In this way, the second electrical connector is located at a position on a same side as the first electrical connector or on a side opposite to the first electrical connector, so that for the memory card, a contact point for connecting to the second electrical connector can be disposed on a card face of a relatively large area.

Optionally, the electrical connector is a spring. In this way, the electrical connector has relatively high structural strength, and can accurately come into contact with and be electrically connected to contact point and electrical contact point areas of relatively small ranges.

Optionally, the holder body includes an accommodation cavity; the card holder further includes a card tray capable of being inserted into the accommodation cavity; the card tray includes at least one recess portion capable of accommodating the nano SIM card; and the recess portion forms at least a partial inner wall of the card slot.

Optionally, the card tray includes one recess portion, and a length direction of the recess portion is parallel or perpendicular to an insertion direction of the card tray.

Optionally, the card tray includes at least two recess portions capable of accommodating the nano SIM card, and the recess portions are spaced along an insertion direction of the card tray. In this way, two nano SIM cards can be both installed in the card holder, or a form of mixed installation of one nano SIM card and one memory card may be used for use, thereby achieving relatively high flexibility.

Optionally, at least one elastic clamping member protruding toward an inner side of the recess portion is disposed on an edge of the recess portion. The elastic clamping member clamps the nano SIM card or the memory card in the recess portion through elastic deformation of the elastic clamping member.

Optionally, the elastic clamping member is a plastic protrusion.

According to a second aspect, this application provides a mobile terminal, including the card holder described above. The card holder is configured to accommodate at least one of a memory card or a nano SIM card.

Optionally, the mobile terminal further includes an identification circuit and a switching circuit. The identification circuit and the switching circuit are both electrically connected to the card holder. The switching circuit is configured to: when at least two electrical connectors matching a same electrical contact point in the memory card or the nano SIM card exist in the card holder, switch the identification circuit to a subscriber identity module SIM card identification mode; or when electrical connectors in the card holder match electrical contact points in a one-to-one manner, switch the identification circuit to a memory card identification mode. In this way, the mobile terminal can distinguish an information card inserted into a card slot of the card holder, thereby establishing a correct connection and performing data transmission.

According to a third aspect, this application provides a card tray. At least one recess portion is disposed on each of a front surface and a back surface of the card tray. The recess portion is configured to accommodate an information card. At least one elastic clamping member protruding toward an inner side of the recess portion is disposed on an inner wall of the recess portion. The elastic clamping member is configured to secure the information card accommodated in the recess portion.

Optionally, the recess portion has a baseboard. Electrical connectors are disposed on a card holder applicable to the card tray, and the baseboard has a hollow area corresponding to an area in which the electrical connectors are located.

Optionally, the elastic clamping member is a plastic protrusion.

According to the card holder and the mobile terminal in this application, the card holder includes the holder body and the plurality of electrical connectors. The holder body is disposed with the card slot matching the nano SIM card. The card slot is configured to accommodate the nano SIM card or the memory card having the same appearance as the nano SIM card. The at least some of the plurality of electrical connectors are the first electrical connectors whose positions match the positions of the electrical contact points in the nano SIM card, and the first electrical connector is configured to electrically connect to the nano SIM card or the memory card accommodated in the card slot. The plurality of electrical connectors are all configured to electrically connect to the memory card. In this way, the card holder can be configured to accommodate the nano SIM card, and the card holder can also use the same card slot to accommodate the memory card having the shape similar to that of the nano SIM card, to implement data expansion and data transmission. The card holder and the mobile terminal have relatively good expandability.

DESCRIPTION OF EMBODIMENTS

Because a current mobile terminal such as a mobile phone has an increasingly small size and volume, more mobile phones or other mobile terminals use a nano SIM card to perform a user identification and authentication operation and the like. In this case, a shape of a card slot of the mobile terminal is also changed to a shape applicable to the nano SIM card. In this way, to implement a data expansion function by using a blank nano SIM card slot into which a card is not inserted, a memory card may be connected and expanded by using a card holder in this application.

Figure 1:
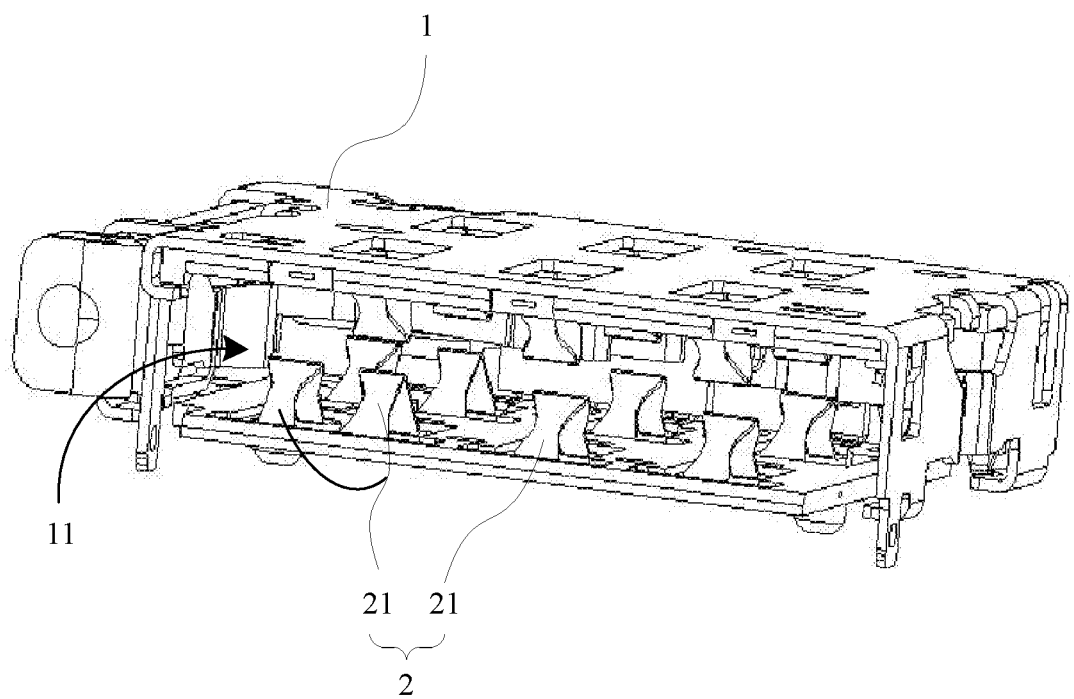
FIG. 1 is a schematic structural diagram of a card holder according to Embodiment 1 of this application.

FIG. 1 is a schematic structural diagram of a card holder according to Embodiment 1 of this application. The card holder in this embodiment is applicable to installation and a connection of a nano SIM card or a memory card. As shown in FIG. 1, the card holder in this embodiment specifically includes a holder body 1 and a plurality of electrical connectors 2. The holder body 1 is disposed with a card slot 11 whose shape and size both match a nano SIM card. The card slot 11 is configured to accommodate the nano SIM card or a memory card having a same appearance as the nano SIM card. At least some of the plurality of electrical connectors 2 are first connectors 21 whose positions match positions of electrical contact points in the nano SIM card. The first electrical connector 21 is configured to electrically connect to the nano SIM card or the memory card accommodated in the card slot 11, and the plurality of electrical connectors 2 are all configured to electrically connect to the memory card.

The card holder can accommodate and connect to the nano SIM card, and can also electrically connect to the memory card. When the card holder is connected to the nano SIM card or the memory card, different functions are correspondingly performed. The memory card in this application may also be referred to as a memory card, mainly refers to a data memory card that performs a data storage function by using a semiconductor memory, and may specifically follow a data interface specification of the SD card, a data interface specification of a micro SD card, and the like.

Figure 2:
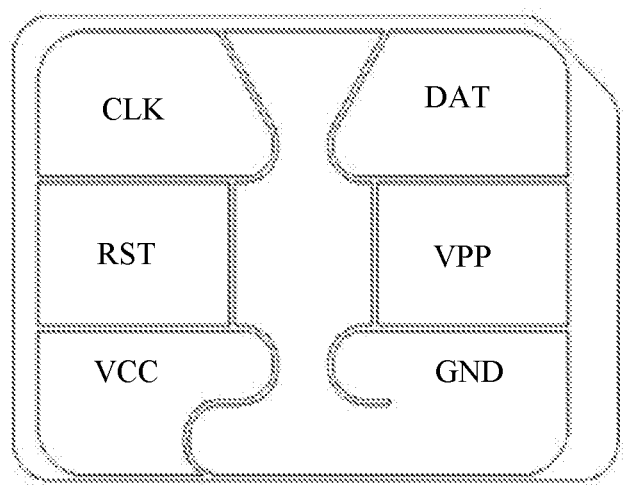
FIG. 2 is schematic structural diagram of a nano SIM card in the prior art.

For example, when the nano SIM card is accommodated in the card slot 11 of the card holder, the card holder is used as a connector of the nano SIM card. A mobile device and the like can read, by using the card holder, user identity information stored in the nano SIM card, or write new user identity information into a storage area in the nano SIM card. FIG. 2 is schematic structural diagram of a nano SIM card in the prior art. As shown in FIG. 2, the nano SIM card is also referred to as a fourth form factor integrated circuit board, and a volume and a size thereof are less than a size of a current SIM card and micro SIM card, and the size is merely 12 mm ×9 mm, so that the nano SIM card has a relatively compact structure. Similar to a common SIM card and micro SIM card, the nano SIM card also includes parts such as a central processing unit (CPU), a read-only memory (ROM), a random access memory (RAM), an electrically erasable programmable read-only memory (EEPROM), and an input/output (I/O) circuit, and is connected to an external circuit by using electrical contact points (pin) located on a card face of the nano SIM card.

A shape of the nano SIM card may be shown in FIG. 2. The nano SIM card includes six electrical contact points (pin), each electrical contact point is used to transmit one signal, and the electrical contact points are isolated from each other through an insulation gap.

The electrical contact point in the nano SIM card or the SIM card refers to a nano point, and refers to a contact point having a particular contact area and having a conductive function in a point card or the SIM card.

A definition of each electrical contact point in the nano SIM card shown in FIG. 2 may be shown in Table 1.

TABLE 1

| Electrical contact point name (Name) | Type (Type) | Description (Description) |
| --- | --- | --- |
| CLK | I | Clock (Clock) |
| DAT | I/O | Data (Data Line) |
| RST | I | Reset Signal Reset Signal |
| VPP | S/I | Programming voltage/input signal (Programming Voltage/Input Signal) |
| VCC | S | Power Supply Power Supply |
| GND | S | Ground (Power Supply ground) |

When the memory card is accommodated in the card slot 11 of the card holder, the card holder may be configured to electrically connect to the memory card, and implement data transmission and exchange between the interior of the memory card and the exterior. The memory card capable of being accommodated in the card slot 11 of the card holder is described in detail below.

Figure 3:
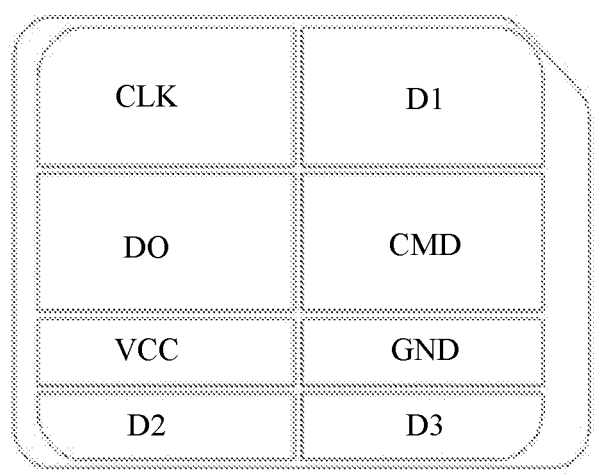
FIG. 3 is a schematic structural diagram of a memory card according to Embodiment 1 of this application.

FIG. 3 is a schematic structural diagram of the memory card according to Embodiment 1 of this application. As shown in FIG. 3, a structure of a main body of the memory card capable of being accommodated in the card holder in this embodiment usually has a shape matching the nano SIM card, so that the memory card can also be accommodated in the card slot in which the nano SIM card can be accommodated. A storage medium disposed in the main body is usually a semiconductor storage medium, and may be configured to store a relatively large capacity of data, for example, an image, audio, a video, or a program, to implement functions such as data storage and data expansion of the memory card. Usually, the storage medium may be a non-volatile memory (Nonvolatile RAM, NVRAM) or the like.

To read and write the storage medium in the memory card, the memory card includes contact points. The contact point is electrically connected to the storage medium, and may be used as an external interface of the memory card to connect to an external port or an external device, to establish an electrical connection and implement data transmission between the memory card and the exterior.

In addition, the memory card further includes a register, a controller, a drive circuit, and the like, to access, manage, and control the storage medium. Specific structures and specifications of the register, the controller, and the drive circuit are similar to those of an existing memory card. Details are not described herein.

Because the memory card has the shape matching the nano SIM card and capable of being accommodated in the card slot 11 of the card holder, the memory card is capable of being inserted into the card slot of the card holder as the nano SIM card, to install the memory card by using a blank card slot to which no card is inserted, and establish a connection and implement data transmission between the memory card and a mobile terminal. In this way, the memory card can provide additional data storage and expansion services for the mobile terminal.

Specifically, that the memory card has the shape matching the nano SIM card usually means that a size of the memory card is similar to that of the nano SIM card. In this case, the main body of the memory card has a sufficiently small size, so that the card slot 11 in which the nano SIM card can be placed and accommodated can also be configured to accommodate the memory card. In addition, the memory card can still be secured in the card slot 11 because of a small volume and size of the memory card, that is, the main body of the memory card can be directly secured in the card slot 11 without depending on another attachment. In this way, the memory card can be placed and secured in the card slot 11 as the nano SIM card. Correspondingly, accommodation and securing of the memory card can be ensured, provided that the shape and the size of the card slot 11 of the card holder can ensure normal insertion and accommodation of the nano SIM card.

Usually, to more conveniently install or remove the memory card in or from the card slot 11, the shape of the memory card usually needs to maintain to be close or similar to the shape of the nano SIM card. Specifically, the main body of the memory card usually also has a sheet-like shape similar to that of the nano SIM card, an area of the main body may be less than or equal to an area of the nano SIM card, a thickness of the main body may be less than, equal to, or slightly greater than a thickness of the nano SIM card, and the like. In this case, the card slot 11 of the card holder can have a same specification and size as a card slot of a common nano SIM card.

In an optional structure, the shape and the size of the main body of the memory card are respectively the same as those of the nano SIM card. In this case, the main body of the memory card and the nano SIM card have the same appearance and size, and both have a flaky-shaped cuboid structure, and a size of a cuboid is 12 mm×9 mm. In this way, an accommodation space formed by the card slot 11 of the card holder may maintain a same appearance, size, and specification, so that both the nano SIM card and the memory card having the size similar to that of the nano SIM card can be placed in the card slot 11, to implement multi-functional use of the card slot 11.

In addition, to enable the memory card and the mobile terminal or another external device perform data transmission, the memory card has the contact points capable of electrically connecting to the exterior. To improve compatibility of the memory card and reduce overall manufacturing and design costs of the memory card, the memory card may follow interface and physical specifications of the micro SD card or the SD card, and the contact point may also follow an external interface parameter of the micro SD card or the SD card.

In an optional implementation, a quantity of contact points in the memory card is the same as a quantity of pins in the micro SD card, and the contact points and the pins in the micro SD card are disposed in a one-to-one correspondence manner. In this way, the contact point in the memory card can follow pin and interface specifications of the micro SD card. Specifically, because the micro SD card usually has eight pins, the memory card may also have eight contact points. In addition, the eight contact points in the memory card respectively correspond to the eight pins in the micro SD card.

Similar to the eight pins in the micro SD card, the eight contact points in the memory card are respectively:

CLK: a clock signal, enabling a bus manager of the memory card to freely generate a frequency of 0-25 MHz without any limitation;

CMD: a command and response reuse pin, capable of sending a command from a controller of an external device to the memory card, or enabling the memory card to make a response to a command for the controller;

DAT0 to DAT3: data lines for implementing bidirectional data transmission between the memory card and the controller;

VDD: used to provide power supply access for the memory card; and

GND: used to establish a ground connection for the memory card.

In this way, the memory card can follow an existing interface definition and data specification of the micro SD card, and the contact point of the memory card establishes an external connection by using an interface definition, a voltage parameter, and a data specification the same as those of the corresponding pin in the micro SD card, so that the mobile terminal and another external device may not need to redefine software interface and data transmission specifications, to establish an electrical connection and implement data transmission between the memory card and a device such as the mobile terminal.

Because a quantity of electrical contact points in the micro SD card is greater than a quantity of electrical contact points in the nano SIM card by 2, if the memory card having the same appearance and size as the nano SIM card needs to be used to implement a storage function, two electrical contact points need to be added to the six electrical contact points in the nano SIM card shown in FIG. 2. In this embodiment of this application, a solution of splitting electrical contact points is used, that is, two electrical contact points are selected from the six electrical contact points in the nano SIM card, and each selected electrical contact point is split into two electrical contact points, to transmit eight signals in the memory card.

It should be noted that, the shape and the size of the memory card in this embodiment of this application are the same as those of the nano SIM card, but an electrical contact point definition of the memory card is the same as that of the micro SD card.

In addition, in this embodiment of this application, in addition to needing to consider a difference between the quantity of electrical contact points in the memory card and the quantity of electrical contact points in the nano SIM card, a correspondence between a signal of the memory card and a signal of the nano SIM card further needs to be limited. That is, for a spring on a card interface, when the nano SIM card is inserted into the card interface, a signal transmitted by using the spring is limited, and correspondingly, when the memory card is inserted into the card interface, a signal transmitted by using the spring is limited.

For example, the correspondence between the signal of the memory card and the signal of the nano SIM card may be set in consideration of the following information:

1. Power supply domains of the memory card and the nano SIM card are both 1.8 V to 3.3 V. Therefore, power supply signals VCC and ground signals GND of the two cards can be shared. Therefore, it may be set in such a manner that a spring configured to transmit the VCC signal when the nano SIM card is inserted is also configured to transmit the VCC signal of the memory card when the memory card is inserted; and it may be set in such a manner that a spring configured to transmit the GND signal when the nano SIM card is inserted is also configured to transmit the GND signal of the memory card when the memory card is inserted. Because the memory card and the nano SIM card are powered by a same power supply, regardless of whether the nano SIM card or the memory card is inserted into the card interface, the VCC signal and the GND signal do not need to be switched between each other.

2. Considering that a clock signal needs to be used as a reference when the memory card and the nano SIM card work, it may be considered that clock signals of the two cards are transmitted by using one spring in a time sharing manner. That is, it may be set in such a manner that a spring configured to transmit the CLK signal when the nano SIM card is inserted is also configured to transmit the CLK signal of the memory card when the memory card is inserted. Because the clock signal of the memory card is different from that of the nano SIM card, an analog switch needs to be disposed to switch between the two CLK signals: When the nano SIM card is inserted, the analog switch switches to the CLK signal of the nano SIM card, and when the memory card is inserted, the analog switch switches to the CLK signal of the memory card.

3. A DAT signal of the nano SIM card may be set to correspond to a DAT1 signal of the memory card, and one analog switch is disposed to switch between the two signals (DAT/DAT1). An RST signal of the nano SIM card may be set to correspond to a DAT0 signal of the memory card, and one analog switch is disposed to switch between the two signals (RST/DAT0). A VPP signal of the nano SIM card may be set to correspond to a CMD signal of the memory card. If an electronic device has an NFC function, one analog switch may be disposed to switch between the two signals (VPP/CMD); or if an electronic device does not have an NFC function, the VPP signal is not involved during use of the nano SIM card, so that an analog switch does not need to be disposed for signal switching.

4. In addition, a DAT2 signal and a DAT3 signal of the memory card may be transmitted by using the two additional electrical contact points obtained by splitting the electrical contact point in the nano SIM card. Because the DAT2 signal and the DAT3 signal are used only by the memory card, an analog switch does not need to be disposed for signal switching.

It should be noted that, the correspondence between the signal of the memory card and the signal of the nano SIM card described above is merely an example. During actual implementation, this is not limited to the foregoing correspondence. That is, the correspondence between the signal of the memory card and the signal of the nano SIM card is not specifically limited in this embodiment of this application. Certainly, preferably, when the VCC signal of the nano SIM card corresponds to the VCC signal of the memory card, and the GND signal of the nano SIM card corresponds to the GND signal of the memory card, implementation is easier.

In addition, in another optional implementation, the quantity of contact points in the memory card may be the same as the quantity of pins in the SD card, and the contact points and the pins in the SD card are disposed in a one-to-one correspondence manner. Similar to the foregoing implementation, the contact point in the memory card may also follow an interface definition and specification of the pin in the SD card, to improve compatibility of the memory card, and reduce overall manufacturing and design costs of the memory card.

When the quantity of contact points in the memory card is the same as the quantity of pins in the SD card, and the contact points are in a one-to-one correspondence with the pins in the SD card, because there are nine pins in the SD card, and a specific pin definition is different from a pin definition of the micro SD card, correspondingly, there should also be nine contact points in the memory card that are in a one-to-one correspondence with the pins in the SD card, as shown in Table 2.

TABLE 2

| Contact point name | Description |
| --- | --- |
| CD/DAT3 | Card monitoring/data bit 3 |
| CMD | Command/reply |
| VSS1 | Ground |
| VCC | Power supply |
| CLK | Clock |
| VSS2 | Ground |
| DAT0 2 | Data bit 0 2 |

Therefore, the memory card to which the card holder in this embodiment can be connected has the shape the same as or similar to that of the nano SIM card, and the contact point follows an existing definition and specification of the micro SD card or the SD card, to improve commonality during data transmission.

To improve reusability of the card holder during a connection, a position of the contact point in the memory card relative to the main body of the memory card usually corresponds to a position of the electrical contact point in the nano SIM card relative to the nano SIM card. To accommodate and connect to the memory card, the card holder also has specific structures in a plurality of different forms. A structure of the card holder is described in detail below.

Specifically, the card holder in this embodiment may be an independent component, or may be integrated into the mobile terminal such as a mobile phone, so that the mobile terminal can be connected to the nano SIM card or the memory card. The card holder includes the holder body 1 configured to physically secure the nano SIM card or the memory card and the plurality of electrical connectors 2 configured to establish an electrical connection. The at least some of the plurality of electrical connectors 2 are the first connectors 21 whose positions match the positions of the electrical contact points in the nano SIM card and that can be configured to electrically connect to the nano SIM card or the memory card. The holder body 1 is disposed with the card slot 11 configured to insert the nano SIM card or the memory card. The size and the shape of the card slot 11 both match the nano SIM card. In this way, both the nano SIM card and the memory card can be accommodated in the card slot 11, and are secured by the card slot 11. The first electrical connector 21 may be electrically connected to the nano SIM card or the memory card accommodated in the card slot 11, to implement reading, writing, and data transmission between the nano SIM card or the memory card and an external device.

The card slot 11 of the card holder may have a plurality of different forms or structures, for example, a detachable drawer-like form or an integrated form. An inner space of the card slot 11 matches the nano SIM card. In an optional form, a shape and a size of the inner space of the card slot 11 may respectively be the same as those of the nano SIM card. In this way, the nano SIM card can be installed in the card slot 11. Because the memory card also maintains the shape and the size that are similar to or the same as those of the nano SIM card, the memory card can also be smoothly installed in the card slot 11 of the card holder.

It should be noted that, that the shape and the size of the inner space of the card slot 11 are respectively the same as the shape and the size of the nano SIM card usually means that the shape of the inner space of the card slot 11 is consistent with the shape of the nano SIM card, and the size of the inner space of the card slot 11 is slightly greater than the size of the nano SIM card. In this way, there is a particular fit clearance between the nano SIM card or the memory card and an inner wall of the card slot 11, so that the nano SIM card or the memory card is smoothly installed in the card slot 11 or is more easily removed from the card slot 11.

To connect to and transmit data to an external device, both the memory card and the nano SIM card need to be electrically connected through the electrical connectors 2. Because the contact points in the memory card and the electrical contact points in the nano SIM card may usually have same or different arrangement layouts and positions, the plurality of electrical connectors 2 in the card holder may also have a plurality of different structures and arrangement forms, and after the memory card or the nano SIM card is placed in the card slot 11, the memory card or the nano SIM card may maintain a connection to some or all of the electrical connectors in the card holder.

The at least some of the electrical connectors 2 in the card holder match the positions of the electrical contact points in the nano SIM card, so that the electrical connectors matching the positions of the electrical contact points in the nano SIM card, namely, the first electrical connectors 21, may be configured to electrically connect to the nano SIM card. In addition, to simplify the structure of the card holder, at least some electrical connectors may be reusable electrical connectors. In this way, the first electrical connector 21, as a common electrical connector, may be configured to connect to the nano SIM card, and may be further configured to come into contact and connect to the corresponding contact point in the memory card, thereby reducing a quantity of electrical connectors 2, and effectively simplifying an inner structure of the card holder. In this case, to enable the memory card also to electrically connect to the first electrical connectors 21 corresponding to arrangement positions of the electrical contact points in the nano SIM card, positions of at least some contact points in the at memory card relative to the main body of the memory card keep consistent with the positions of the electrical contact points in the nano SIM card relative to the nano SIM card.

In this case, at least some electrical connectors in the card holder may be directly connected to the electrical contact points in the nano SIM card, and are configured to transmit information in the nano SIM card. The contact points in the memory card may be electrically connected to other electrical connectors whose positions are different from those of the first electrical connectors 21, or the first electrical connectors matching the positions of the electrical contact points in the nano SIM card may be used to establish an electrical connection, thereby reusing the electrical connectors, and reducing an overall quantity of electrical connectors and simplifying structural complexity.

Figure 4:
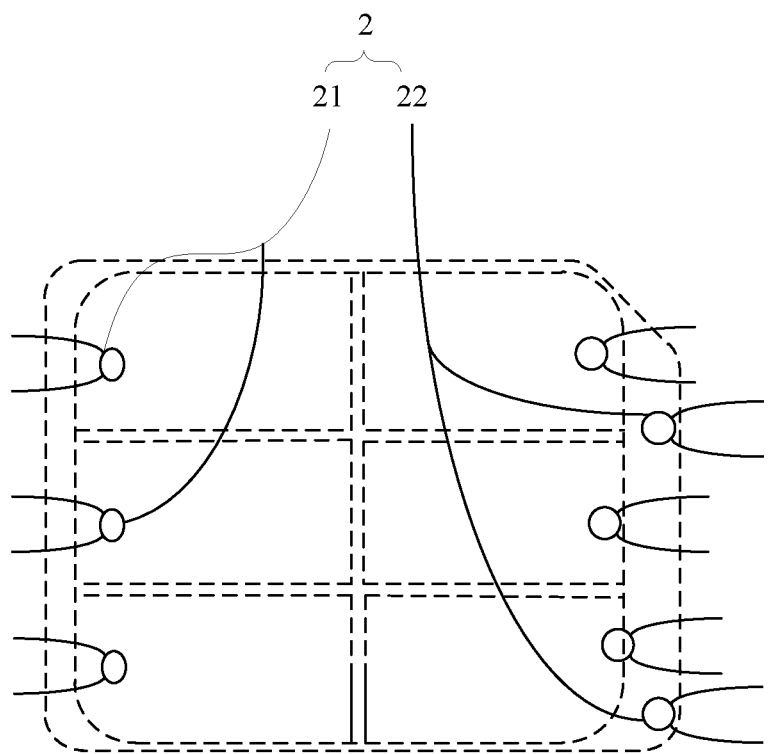
FIG. 4 is a schematic diagram of arrangement of electrical connectors in the card holder according to Embodiment 1 of this application.

FIG. 4 is a schematic diagram of arrangement of the electrical connectors in the card holder according to Embodiment 1 of this application. As shown in FIG. 4, in an optional form, the first electrical connectors 21 may be only some electrical connectors in the card holder. In this case, the plurality of electrical connectors include a second electrical connector 22. A position of the second electrical connector 22 does not correspond to a position of any electrical contact point in the nano SIM card.

There may be one or more second electrical connectors 22. The position of the second electrical connector 22 and the position of the electrical contact point in the nano SIM card are staggered, so that the second electrical connector 22 cannot be configured to connect to the nano SIM card, but only can be configured to connect the contact point in the memory card. In this case, positions of some contact points in the memory card relative to the main body of the memory card may correspond to the positions of the electrical contact points in the nano SIM card relative to the nano SIM card, and the other contact points are located at positions different from those of the electrical contact points in the nano SIM card, and come into contact with and are electrically connected to the second electrical connector 22.

Because the position of the second electrical connector 22 and the position of the electrical contact point in the nano SIM card are staggered, the second electrical connector 22 may be located on different surfaces of the card slot 11, for example, a surface opposite to the front surface of the memory card located in the card slot 11, a surface opposite to a back surface of the memory card, or a surface opposite to a side edge of the memory card. Optionally, the second electrical connector 22 is located in a projection area of the nano SIM card in the card slot 11 in a direction perpendicular to a card face. As shown in FIG. 4, the second electrical connector 22 is located on a same side as the first electrical connector 21 or on a side opposite to the first electrical connector 21, so that for the memory card, a contact point for connecting to the second electrical connector 22 can be disposed on a card face of a relatively large area. Specifically, when the second electrical connector 22 is located on the same side as the first electrical connector 21, that is, on an inner wall on a same side of the card slot 11, the second electrical connector 22 may be located outside a disposition area of the electrical contact points in the nano SIM card, that is, positions of some contact points in the memory card relative to the main body of the memory card are positions outside the disposition area of the electrical contact points in the nano SIM card relative to the nano SIM card.

Figure 5:
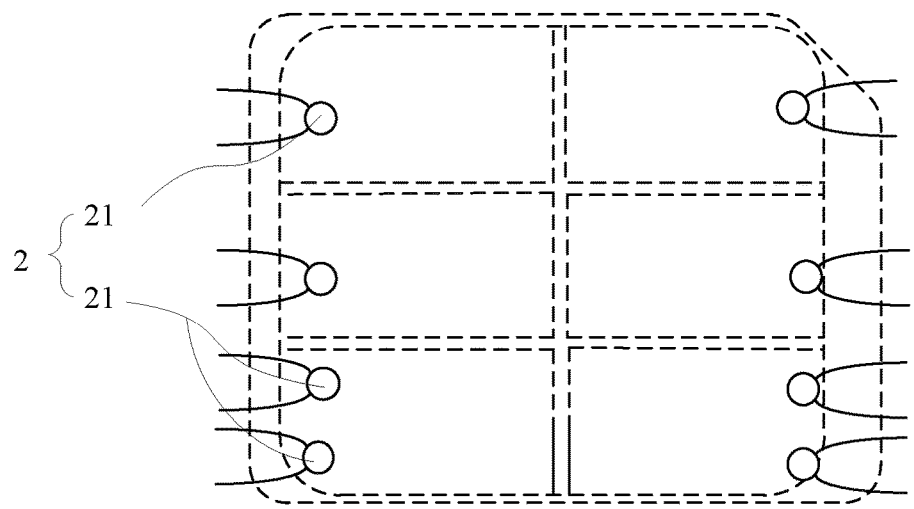
FIG. 5 is another schematic diagram of arrangement of electrical connectors in the card holder according to Embodiment 1 of this application.

FIG. 5 is another schematic diagram of arrangement of the electrical connectors in the card holder according to Embodiment 1 of this application. As shown in FIG. 5, in another optional form, all the electrical connectors 2 may be first electrical connectors 21 whose positions match the positions of the electrical contact points in the nano SIM card. In this case, all the electrical connectors in the card holder are first electrical connectors 21. Therefore, when the nano SIM card is inserted into the card slot 11, all the electrical connectors 2 come into contact with and are connected to the electrical contact points in the nano SIM card. When the memory card is inserted into the card slot 11, because all the electrical connectors 2 are located at positions in the card slot that match the positions of the electrical contact points in the nano SIM card, the contact points in the memory card are evenly distributed at positions corresponding to the electrical contact points in the nano SIM card, and the first electrical connectors 21 are used to establish an electrical connection and implement data transmission. Unless otherwise specified below, an example in which all the electrical connectors are the first electrical connectors 21 is used for description.

Figure 6:
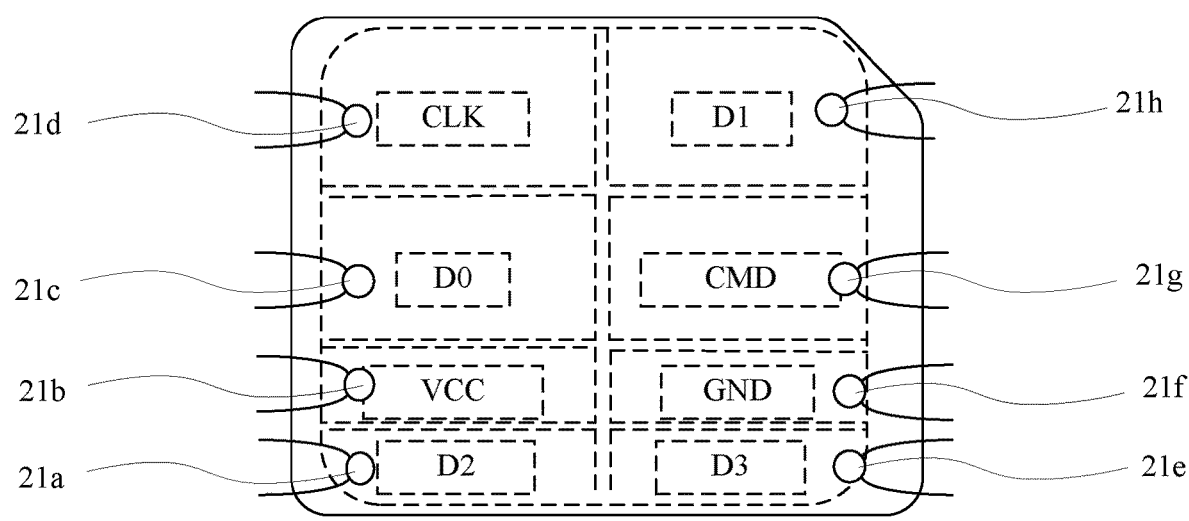
FIG. 6 is a schematic diagram of a correspondence between the electrical connector in the card holder and a contact point in the memory card according to Embodiment 1 of this application.
Figure 7:
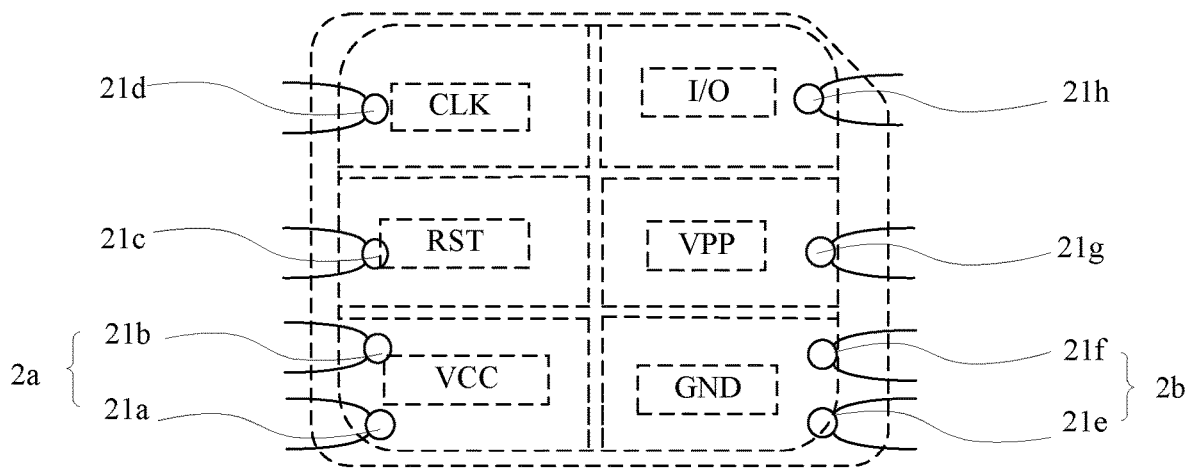
FIG. 7 is a schematic diagram of a correspondence between the electrical connector in the card holder and an electrical contact point in a nano SIM card according to Embodiment 1 of this application.

FIG. 6 is a schematic diagram of a correspondence between the electrical connector in the card holder and the contact point in the memory card according to Embodiment 1 of this application. FIG. 7 is a schematic diagram of a correspondence between the electrical connector in the card holder and the electrical contact point in the nano SIM card according to Embodiment 1 of this application. Because the memory card usually follows an existing interface specification of the micro SD card or the SD card, there are usually eight or more contact points in the memory card, while there are six electrical contact points in the nano SIM card. In this case, to improve a reuse degree of the electrical connector, in an optional manner, in the first electrical connectors 21 whose positions match the positions of the electrical contact points in the nano SIM card, there are at least two first electrical connectors matching a position of a same electrical contact point in the nano SIM card. In FIG. 6, a first electrical connector 21b corresponds to a VCC contact point in the memory card, a first electrical connector 21a corresponds to a D2 contact point in the memory card, a first electrical connector 21f corresponds to a GND contact point in the memory card, a first electrical connector 21e corresponds to a D3 contact point in the memory card, a first electrical connector 21c corresponds to a D0 contact point in the memory card, a first electrical connector 21d corresponds to a CLK contact point in the memory card, a first electrical connector 21g corresponds to a CMD contact point in the memory card, and a first electrical connector 21h corresponds to a D1 contact point in the memory card. In FIG. 7, the first electrical connector 21a and the first electrical connector 21b both correspond to the VCC contact point in the nano SIM card, the first electrical connector 21e and the first electrical connector 21f both correspond to the GND contact point in the nano SIM card, the first electrical connector 21c corresponds to an RST contact point in the nano SIM card, the first electrical connector 21d corresponds to a CLK contact point in the nano SIM card, the first electrical connector 21g corresponds to a VPP contact point in the nano SIM card, and the first electrical connector 21h corresponds to an I/O contact point in the nano SIM card.

In this case, the quantity of first electrical connectors 21 may be made the same as the quantity of contact points in the memory card, and the first electrical connectors 21 maintain a one-to-one correspondence with the contact points in the memory card, that is, the first connectors 21 correspond to different contact points in the memory card. The quantity of contact points in the memory card is greater than the quantity of electrical contact points in the nano SIM card, so that there are at least two first electrical connectors matching a position of a same electrical contact point in the nano SIM card. In this way, when two first electrical connectors 21 match and correspond to a same electrical contact point in the nano SIM card, the first electrical connectors 21 can be electrically connected to the nano SIM card. When two first electrical connectors 21 correspond to two different contact points in the memory card, the first electrical connectors 21 can be electrically connected to the memory card. In this case, the position of the first electrical connector 21 can still correspond to the electrical contact point in the nano SIM card, thereby effectively reusing the electrical connector, and simplifying the structure of the card holder.

Two or more first electrical connectors may match a position of a same electrical contact point. When an excessive quantity of first electrical connectors 21 match and correspond to a same electrical contact point, an accidental connection, a short circuit, or the like may occur between the first electrical connectors 21 and the electrical contact point. To ensure a normal and reliable connection between the first electrical connectors 21 and the electrical contact point, optionally, a maximum of two first electrical connectors may match a position of a same electrical contact point. In this case, there is an appropriate gap between the first electrical connectors 21 corresponding to the same electrical contact point.

To enable the first electrical connectors 21 to implement normal communication and data transmission with the memory card, the first electrical connectors 21 should maintain a one-to-one correspondence connection relationship with different contact points in the memory card, and at least two first electrical connectors 21 matching a position of a same electrical contact point in the nano SIM card correspond to different contact points in the memory card. In this way, the first electrical connectors 21 correspondingly connected to the same electrical contact point can also be normally connected to the different contact points in the memory card.

In this case, because there are usually six electrical contact points in the nano SIM card, and there are usually more than six (usually eight or more) contact points in the memory card, at least two of the first electrical connectors 21 in the card holder need to share a same electrical contact point in the nano SIM card with another first electrical connector, and other first electrical connectors maintain a one-to-one correspondence with the electrical contact points.

In this way, optionally, the plurality of electrical connectors 2 may include at least two electrical connector assemblies, and each electrical connector assembly includes at least two first electrical connectors matching a position of a same electrical contact point in the nano SIM card, so that the electrical contact point in the nano SIM card is a common electrical contact point, and is connected to different first electrical connectors. In this way, at least some of the first electrical connectors 21 are connected to the same common electrical contact point.

Further, because there are usually eight or nine contact points in the memory card, in all the electrical connectors, some first electrical connectors are connected to a same electrical contact point. That is, in all the electrical connectors, some first electrical connectors are in the electrical connector assembly, and the other first electrical connectors are outside the electrical connector assembly. In an optional implementation, the plurality of electrical connectors may include two electrical connector assemblies. First electrical connectors 21 in the two electrical connector assemblies correspond to a position of a same electrical contact point in the nano SIM card.

When the contact point in the memory card follows an interface specification of the micro SD card, there are eight contact points in the memory card. In this case, to connect to the contact points in the memory card in a one-to-one correspondence manner, the quantity of first electrical connectors 21 in the card holder is the same as the quantity of contact points in the memory card, and is 8. To enable the eight first electrical connectors correspond to the six electrical contact points in the nano SIM card, optionally, each electrical connector assembly includes two first electrical connectors matching a position of a same electrical contact point. In this way, based on a manner in which two electrical connector assemblies are set, and two first electrical connectors 21 in each electrical connector assembly both correspond to a same electrical contact point, the first electrical connectors 21 can correspondingly match the six electrical contact points in the nano SIM card, and can also correspondingly match the eight contact points in the memory card.

A person skilled in the art may understand that, when there are at least eight contact points in the memory card, the plurality of electrical connectors 2 may include at least two electrical connector assemblies, and each electrical connector assembly may also include at least two first electrical connectors 21 matching a position of a same electrical contact point. For example, when there are nine contact points in the memory card, the plurality of electrical connectors 2 in the card holder may include three electrical connector assemblies, and each electrical connector assembly includes two first electrical connectors 21 corresponding to a position of a same electrical contact point, or the plurality of electrical connectors 2 in the card holder include two electrical connector assemblies, one of the electrical connector assemblies includes two first electrical connectors 21 corresponding to a position of a same electrical contact point, and the other electrical connector assembly includes three first electrical connectors 21 corresponding to a position of a same electrical contact point.

Further, as shown in FIG. 7, the at least two electrical connector assemblies include a first electrical connector assembly 2a and a second electrical connector assembly 2b. First electrical connectors 21a and 21b in the first electrical connector assembly 2a both match a position of the VCC contact point in the nano SIM card, and first electrical connectors 21e and 21f in the second electrical connector assembly 2b both match a position of the GND contact point in the nano SIM card. Because the VCC contact point and the GND contact point are both used to power the nano SIM card, and are not used to transmit data and information. Therefore, when the plurality of first electrical connectors match and are connected to the VCC contact point or the GND contact point, a common electrical contact point occupied by diffident first electrical connectors is an electrical contact point or a ground contact point for transmitting no data signal and for power supplying. In this way, when the card holder is connected to the nano SIM card, the first electrical connectors in the first electrical connector assembly 2a or the second electrical connector assembly 2b are both connected to contact points capable of providing a constant power supply signal, so that a connection status of the contact point and the first electrical connector 21 is easily detected, to identify a type of a card inserted into the card holder. In addition, a common electrical contact point connected to two or more first electrical connectors is an electrical contact point for power supplying in the nano SIM card. The electrical contact point provides only a stable power supply without transmitting a changed data signal, so that even if different first electrical connectors are connected to a same common electrical contact point, reading and data transmission of the nano SIM card are not affected.

In addition, according to different specific structures of the card holder and contact point structures of the memory card, the plurality of first electrical connectors 21 may also match a position of another electrical contact point in the nano SIM card, for example, match and are connected to the VPP contact point and the DAT contact point in the nano SIM card, and a corresponding matching manner thereof is similar to that described above, and details are not described herein again.

Figure 8:
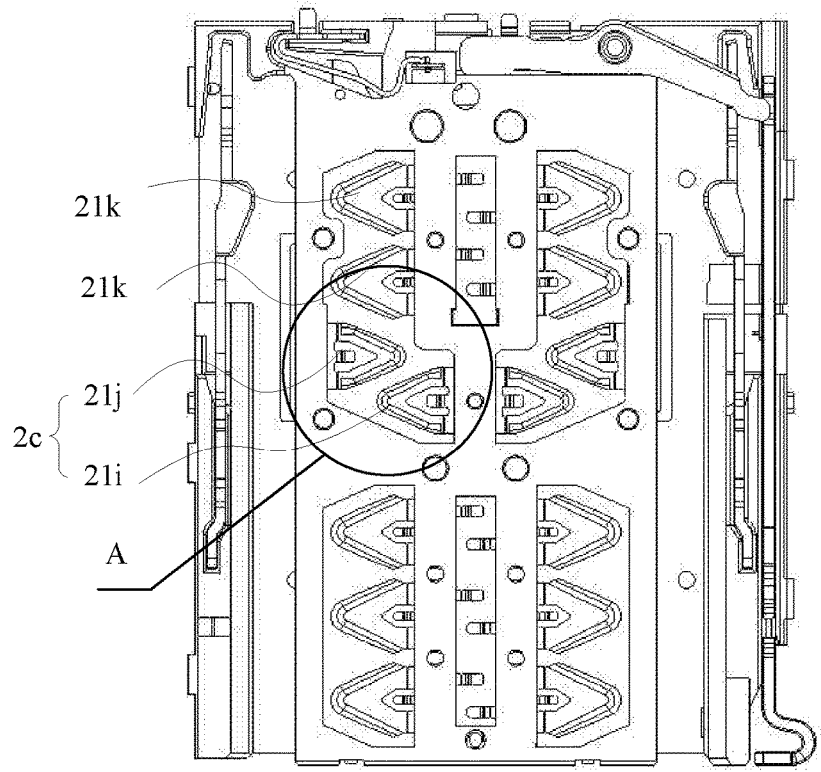
FIG. 8 is a schematic structural diagram of the electrical connector according to Embodiment 1 of this application.
Figure 9:
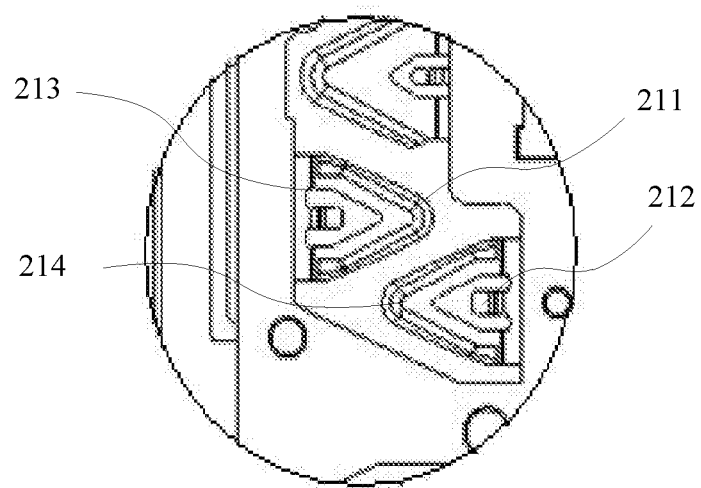
FIG. 9 is a partially enlarged view of a part A in FIG. 8.

When there are a plurality of electrical connectors 2 matching a position of a same electrical contact point, because of a relatively limited inner space of the card holder, the plurality of electrical connectors 2 need to be properly laid out. The electrical connectors 2 may also be arranged in a plurality of different manners, and an arrangement manner may be an arrangement direction, an arrangement gap, and the like of the first electrical connectors 21. In an optional arrangement manner, different first electrical connectors in each electrical connector assembly have different arrangement directions. FIG. 8 is a schematic structural diagram of the electrical connector according to Embodiment 1 of this application. FIG. 9 is a partially enlarged view of a part A in FIG. 8. As shown in FIG. 8, the card holder includes two card slots that are disposed sequentially in series and that can be configured to connect to and read the nano SIM card or the memory card. A card slot above is used as an example. In the card slot above, a plurality of first electrical connectors are disposed symmetrically in two rows, and the first electrical connectors 21 in each row are spaced. Each row has one electrical connector assembly including a plurality of first electrical connectors 21, and in the first electrical connectors 21 in each row, the first electrical connectors in the electrical connector assembly have different arrangement directions, so that the first electrical connectors 21 can be arranged in a staggered manner, to reduce a gap between the first electrical connectors 21. Therefore, in the limited space of the card holder, a relatively large quantity of electrical connectors may be arranged at proper gaps. The disposition manner of the electrical connectors is mainly applicable to a vertically placed card holder, that is, a length direction of the card slot is parallel to an insertion direction of an information card.

Further, the first electrical connectors 21 are usually arranged side by side. For example, as shown in FIG. 8, to use the limited space, the two first electrical connectors in the electrical connector assembly and another first electrical connector outside the electrical connector assembly may maintain a similar arrangement rule. In an optional manner, each electrical connector assembly includes two first electrical connectors 21, and arrangement directions of one of the two first electrical connectors 21 and another first electrical connector outside the electrical connector assembly are exactly the same, and arrangement directions of the other first electrical connector and the other first electrical connector are reverse. Specifically, the quantity of electrical connectors in the card holder may be set to 8, the eight electrical connectors are divided into two symmetrical rows for arrangement, and each row has four first electrical connectors 21. The four first electrical connectors 21 in each row may maintain a state in which the four first electrical connectors are parallel to each other or approximately parallel to each other, and each row has one electrical connector assembly. One row of electrical connectors of an electrical connector assembly 2c is used as an example for description. Arrangement directions of one first electrical connector 21i in two first electrical connectors in the electrical connector assembly 2c and the other first electrical connector 21j in the electrical connector assembly are exactly reverse, and in the row of first electrical connectors, arrangement directions of other first electrical connectors 21k outside the electrical connector assembly 2c are all the same as the arrangement direction of the first electrical connector 21i. In this case, a relatively large gap may be maintained between the first electrical connectors 21k in each row, to normally read and operate the nano SIM card, and establish an electrical connection to contact points in the memory card that are in a one-to-one correspondence with the electrical contact points. As shown in FIG. 8 and FIG. 9, because the first electrical connector 21i and the other first electrical connector 21j in the electrical connector assembly 2c are both correspondingly located in an area of a same electrical contact point, the first electrical connector 21i and the other first electrical connector 21j in the electrical connector assembly need to be staggered, so that a narrower end 211 of the first electrical connector 21j in the electrical connector assembly 2c may be located on a side of a root 212 of the other first electrical connector, and a wider root 213 of the first electrical connector 21j in the electrical connector assembly 2c and a narrower end 214 of the other first electrical connector are disposed side by side. In this way, a sufficient gap may be maintained between the first electrical connectors 21, to avoid accidental contact between the first electrical connector 21 and the contact point or the electrical contact point.

In addition, the first electrical connectors 21i and 21j in the electrical connector assembly 2c may alternatively be arranged along another direction, provided that the first electrical connectors 21i and 21j are staggered from another first electrical connector, to arrange the first electrical connectors 21i and 21j in the limited pace, and a sufficient gap is maintained between different first electrical connectors. This is not limited herein.

Figure 10:
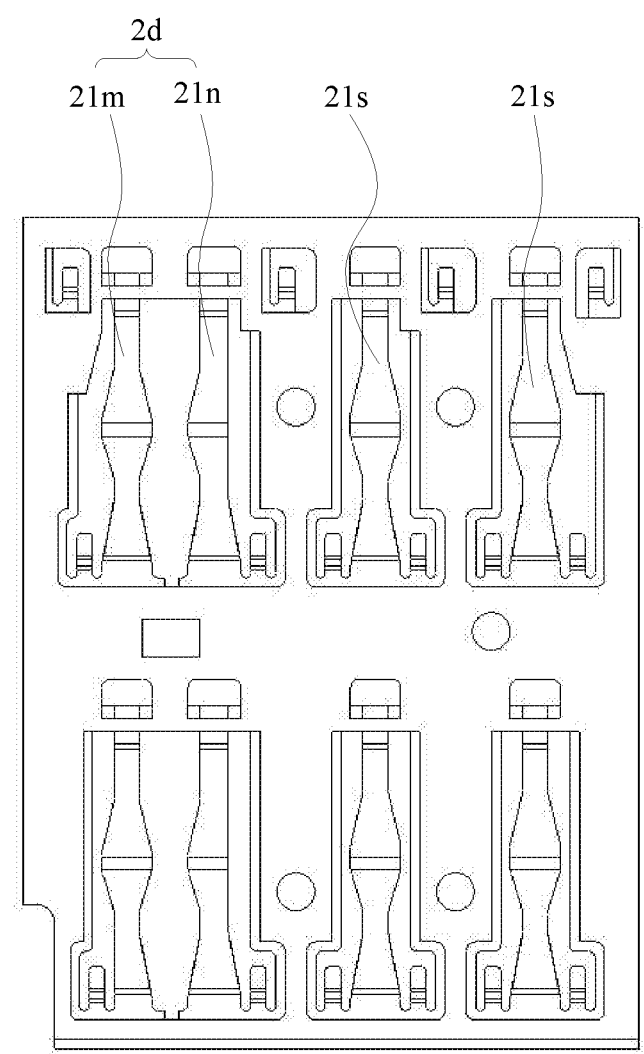
FIG. 10 is another schematic structural diagram of the electrical connector according to Embodiment 1 of this application.

FIG. 10 is another schematic structural diagram of the electrical connector according to Embodiment 1 of this application. As shown in FIG. 10, in another optional arrangement manner, there is at least one first electrical connector in each electrical connector assembly, and there are different gaps between the at least one first electrical connector and first electrical connectors outside the electrical connector assembly. Because each electrical connector assembly includes two or more first electrical connectors matching and connected to a same electrical contact point in the nano SIM card, when there are small differences between areas and sizes of the electrical contact points in the nano SIM card, there may be a relatively small gap between the first electrical connectors corresponding to the same electrical contact point, so that different first electrical connectors are correspondingly connected to a same electrical contact point, thereby avoiding an accidental connection or a short circuit.

Specifically, FIG. 10 is used as an example. There are eight electrical connectors in the card holder, the eight electrical connectors are divided into two symmetrical rows for arrangement, and each row has four first electrical connectors 21. The four first electrical connectors 21 in each row may maintain a state in which the four first electrical connectors are parallel to each other or approximately parallel to each other, and each row includes one electrical connector assembly. One row of electrical connectors of an electrical connector assembly 2d is used as an example for description. There are two first electrical connectors 21m and 21n in the electrical connector assembly 2d, and a gap between the two first electrical connectors 21m and 21n is smaller than a gap between other first electrical connectors 21s outside the electrical connector assembly 2d in the row of electrical connectors. In this way, a plurality of first electrical connectors 21 can be correspondingly connected to a same electrical connection point in a limited area. The disposition manner of the electrical connectors is usually applicable to a horizontally placed card holder, that is, the length direction of the card slot is perpendicular to the insertion direction of the information card.

Figure 11:
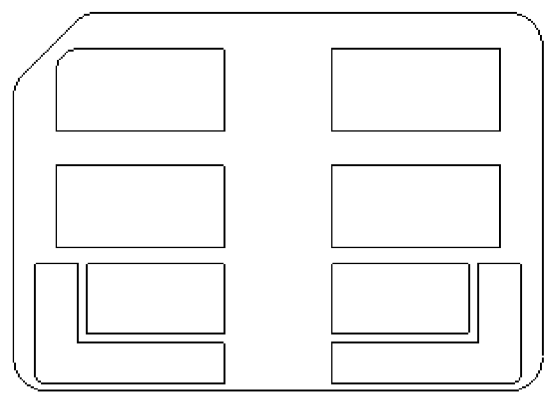
FIG. 11 is another schematic diagram of a position of the contact point in the memory card according to Embodiment 1 of this application.
Figure 12:
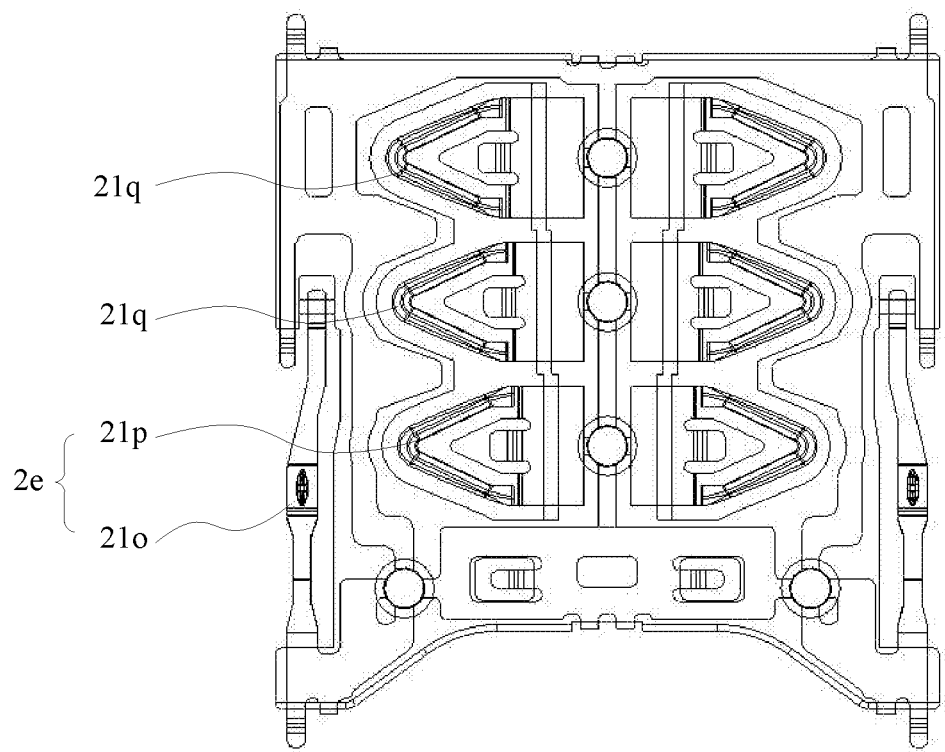
FIG. 12 is still another schematic structural diagram of the electrical connector according to Embodiment 1 of this application.

In addition, a first electrical connector and another first electrical connector in a same electrical connector assembly may have different shapes or structures or the like, so that the first electrical connectors are accommodated in the limited space, and there is a proper gap between the first electrical connectors. Specifically, FIG. 11 is another schematic diagram of a position of the contact point in the memory card according to Embodiment 1 of this application. The position of the contact point is shown in FIG. 11, the contact points in the memory card accommodated in the card holder correspond to the positions of the electrical contact points in the nano SIM card. However, because of irregular shapes of the contact points, it is difficult to connect first electrical connectors of a same size to these contact points in a one-to-one correspondence manner. Therefore, to adapt to the positions of the contact points in the memory card, optionally, at least one of the first electrical connectors in the electrical connector assembly in the card holder has a shape different from that of a first electrical connector outside the electrical connector assembly. FIG. 12 is still another schematic structural diagram of the electrical connector according to Embodiment 1 of this application. As shown in FIG. 12, in still another optional arrangement manner, there is a first electrical connector in each electrical connector assembly that has a shape different from that of a first electrical connector outside the electrical connector assembly. FIG. 12 is used as an example. There are eight electrical connectors that are divided into two rows for arrangement, and each row has one electrical connector assembly. Each electrical connector assembly includes two first electrical connectors corresponding to a position of a same electrical contact point in the nano SIM card. One first electrical connector in the same electrical connector assembly has a same appearance and structure as another first electrical connector outside the electrical connector assembly, and the other first electrical connector uses a different structure, to ensure that the first electrical connectors can be connected to the contact points in a one-to-one correspondence manner. Specifically, using an electrical connector assembly 2e as an example, the electrical connector assembly 2e includes a first electrical connector 21p having a same appearance and structure as another first electrical connector 21q, and also includes a first electrical connector 21o having a shape and a structure that are respectively different from those of the first electrical connector 21q in the row, to match and connect to the contact points by using a special shape of the first electrical connector 21o.

Specifically, the electrical connector in the card holder usually has a spring structure, and a root of the electrical connector is usually connected to the main body of the card holder and is wider, while an end of the electrical connector is narrower and can abut against the electrical contact point. In this way, the electrical connector 2 has relatively high structural strength, and can accurately come into contact with and be electrically connected to contact point and electrical contact point areas of relatively small ranges.

Figure 13:
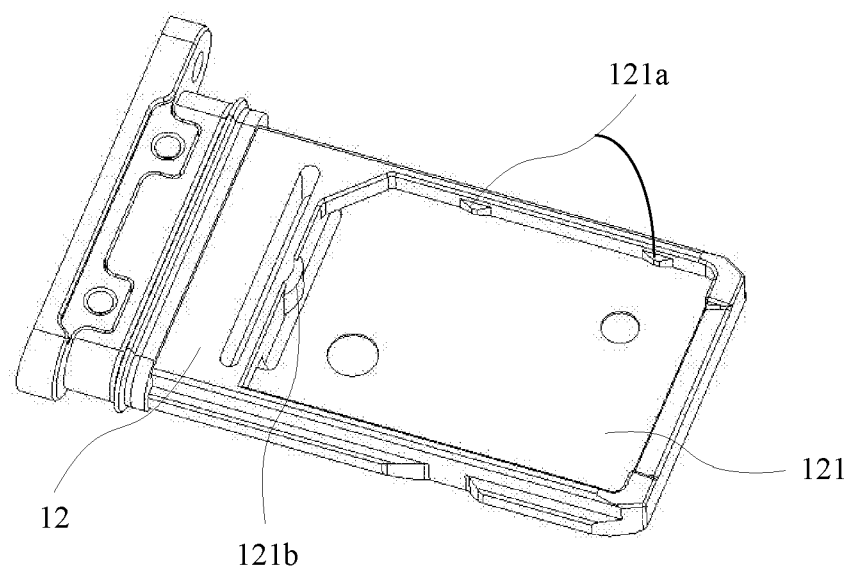
FIG. 13 is a schematic structural diagram of a card tray according to Embodiment 1 of this application.

Optionally, to install the nano SIM card and the memory card in the card holder, the holder body 1 of the card holder may also have a plurality of different structures and forms. Because a current card holder is usually applied to an apparatus such as a mobile terminal having relatively strong structural integrity and a relatively high portability requirement, the card slot 11 of the card holder usually uses an insertion-type design. In an optional structure of the card holder, the holder body 1 of the card holder may usually include an accommodation cavity, and the card holder further includes a card tray capable of being inserted into the accommodation cavity. FIG. 13 is a schematic structural diagram of the card tray according to Embodiment 1 of this application. As shown in FIG. 1 and FIG. 13, the card tray 12 may be inserted into an opening of the accommodation cavity that is provided on the holder body 1 of the card holder, to accommodate the nano SIM card or the memory card in the card slot 11. The card tray 12 includes at least one recess portion 121 capable of accommodating the nano SIM card. The recess portion 121 forms at least a partial inner wall of the card slot 11. In this way, the nano SIM card or the memory card may be first placed in the recess portion 121 of the card tray 12, and then the card tray 12 is inserted into the accommodation cavity. In this case, the nano SIM card or the memory card can be accommodated in the card slot 11 enclosed by the card tray 12 and the accommodation cavity, to install the nano SIM card or the memory card.

Figure 14A:
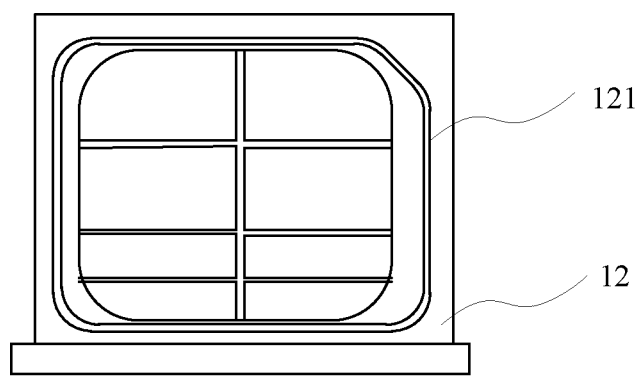
FIG. 14a is a first possible schematic structural diagram of a card tray having one recess portion according to Embodiment 1 of this application.
Figure 14B:
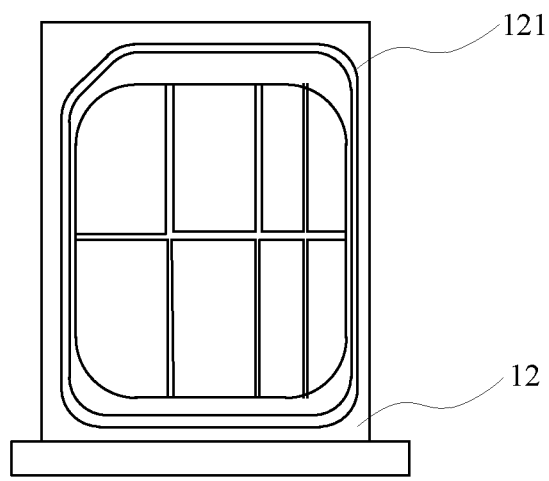
FIG. 14b is a second possible schematic structural diagram of a card tray having one recess portion according to Embodiment 1 of this application.

FIG. 14*a* is a first possible schematic structural diagram of a card tray having one recess portion according to Embodiment 1 of this application. FIG. 14*b* is a second possible schematic structural diagram of a card tray having one recess portion according to Embodiment 1 of this application. As shown in FIG. 14*a* and FIG. 14*b*, optionally, the card tray 12 may include one recess portion 121, and a length direction of the recess portion 121 is parallel or perpendicular to an insertion direction of the card tray 12. The recess portion 121 is configured to accommodate one nano SIM card or one memory card. In addition, a shape of the recess portion 121 keeps consistent with the shape of the nano SIM card or the memory card, so that the nano SIM card or the memory card is secured in the recess portion 121.

Figure 15A:
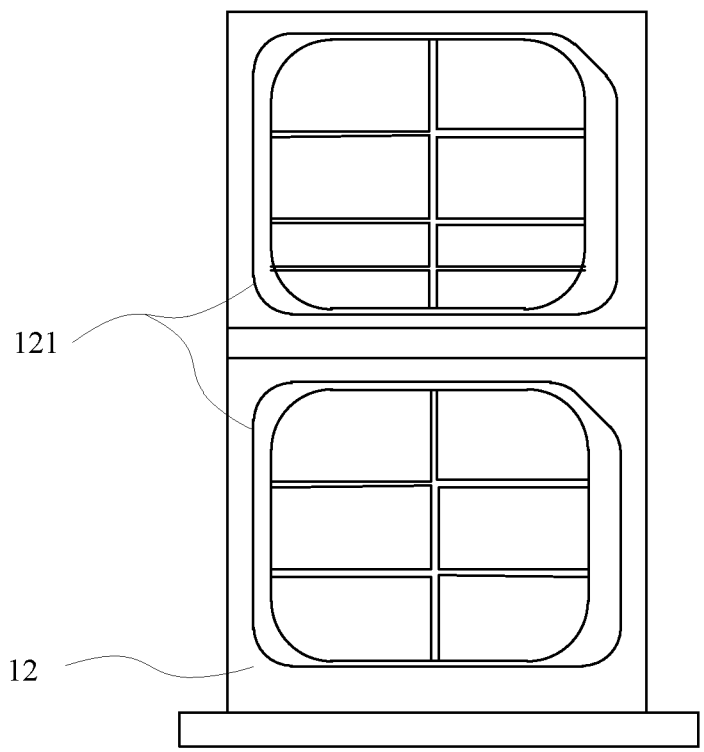
FIG. 15a is a first possible schematic structural diagram of a card tray having two recess portions according to Embodiment 1 of this application.
Figure 15B:
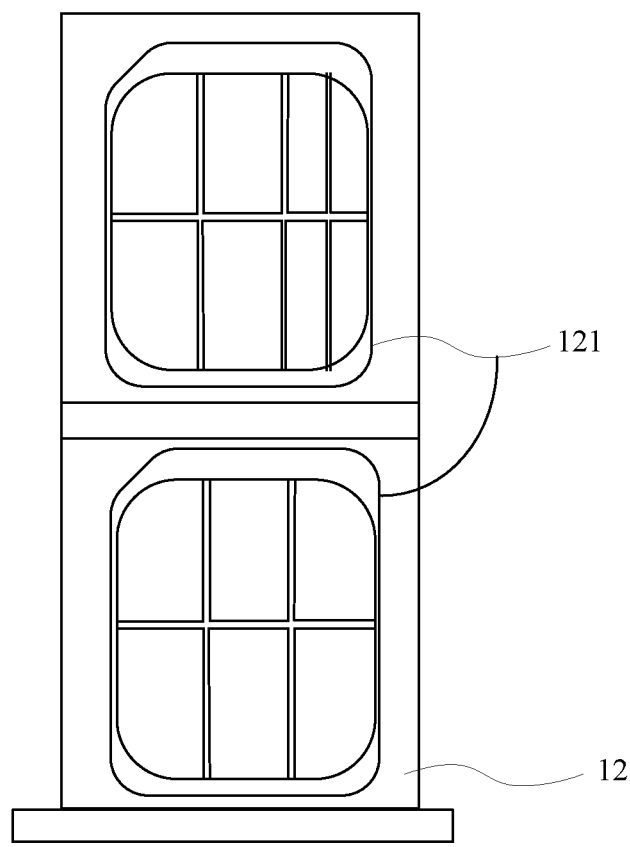
FIG. 15b is a second possible schematic structural diagram of a card tray having two recess portions according to Embodiment 1 of this application.

In addition, the card holder may also be used for two or more nano SIM cards or memory cards. In this way, two nano SIM cards can be both installed in the card holder, or a form of mixed installation of one nano SIM card and one memory card may be used for use, thereby achieving relatively high flexibility. FIG. 15*a* is a first possible schematic structural diagram of a card tray having two recess portions according to Embodiment 1 of this application. FIG. 15*b* is a second possible schematic structural diagram of a card tray having two recess portions according to Embodiment 1 of this application. As shown in FIG. 15*a* and FIG. 15*b*, specifically, in this case, the card tray 12 may include at least two recess portions 121 capable of accommodating the nano SIM card, and the recess portions 121 are spaced along an insertion direction of the card tray 12. In this way, the nano SIM card and the memory card can be respectively installed in the two recess portions 121, and are sequentially inserted into the accommodation cavity with the card tray 12. The card tray in FIG. 15*a* may be used for the card holder and the card slot in FIG. 8.

It should be noted that, when two or more nano SIM cards or memory cards are installed in the card holder, the quantity of electrical connectors in the card holder also needs to be multiplied based on a quantity of installed cards, and a position of an added electrical connector needs to correspond to and match a position of a newly added card.

When the card tray 12 of the card holder has two or more recess portions 121 configured to accommodate nano SIM cards or memory cards, optionally, length directions of all the recess portions 121 may be parallel to the insertion direction of the card tray 12; or length directions of all the recess portions 121 are perpendicular to the insertion direction of the card tray 12. In this way, the nano SIM cards or the memory cards are arranged in a relatively orderly manner in the recess portion 121, to help arrange and dispose the electrical connectors and another circuit in the card holder.

The recess portion 121 configured to accommodate the nano SIM card or the memory card may also have a plurality of different structures and forms. For example, optionally, the recess portion 121 may be a groove with an opening on one side and a closed groove bottom on the other side, or the recess portion 121 may be an accommodation hole penetrating through the entire card tray 12. In this case, the nano SIM card or the memory card is suspended and secured on the card tray 12 depending on a hole wall of the accommodation hole.

To dispose the nano SIM card and the memory card in the accommodation hole in a suspended manner or to effectively secure and locate the nano SIM card or the memory card in a state in which a nano SIM card or a memory card is disposed on each of two surfaces of the card tray, in an optional implementation, at least one elastic clamping member 121*a* protruding toward an inner side of the recess portion 121 is disposed on an edge of the recess portion 121. Because a contour of the recess portion 121 usually matches the nano SIM card or is slightly larger than the shape of the nano SIM card, when the nano SIM card or the memory card is installed in the recess portion 121, the elastic clamping member 121*a* is squeezed and the elastic clamping member 121*a* is enabled to deform, so that the elastic clamping member 121*a* can abut against an edge of the nano SIM card or the memory card under the action of an elastic force of the deformation of the elastic clamping member 121*a* to clamp the nano SIM card or the memory card, and secure the nano SIM card or the memory card. One end of the recess portion 121 close to an insertion side is further disposed with a metal spring 121*b*, to well support and locate the nano SIM card or the memory card in the recess portion 121.

Further, the elastic clamping member 121*a* may be a plastic protrusion. Plastic has good elasticity, can produce relatively large deformation under the action of an external force, and is quickly reset after the removal of the external force, so that the nano SIM card or the memory card accommodated in the recess portion 121 can be well supported. In addition, the plastic has relatively low hardness, to avoid damage to a surface of the nano SIM card or the memory card.

Optionally, the plastic protrusion may be detachably installed or integrally formed in the card tray 12, which, for example, may be implemented in a manner of performing injection molding a plurality of times.

Optionally, there may be one or more elastic clamping members 121*a*, and when there are a plurality of elastic clamping members 121*a*, the plurality of elastic clamping members 121*a* may be arranged along a circumferential direction of the recess portion 12.

In addition, when the recess portion 121 is a groove having a bottom surface, there may be an identifier for prompting, for example, prompting for a placement direction of the card in the card slot, on the bottom surface of the recess portion 121. The identifier may be set on the bottom surface of the recess portion 121 through laser engraving or printing.

Figure 16:
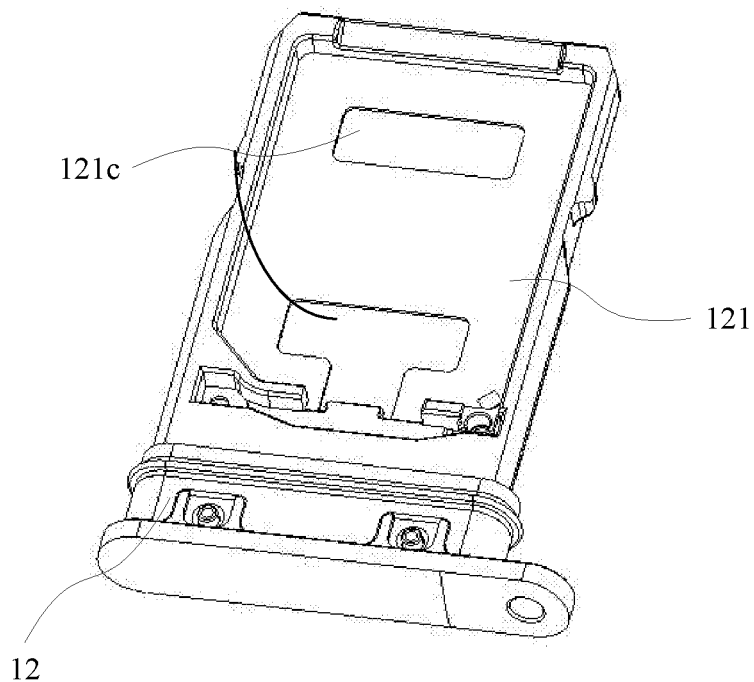
FIG. 16 is another schematic structural diagram of a card tray according to the present invention.
Figure 17:
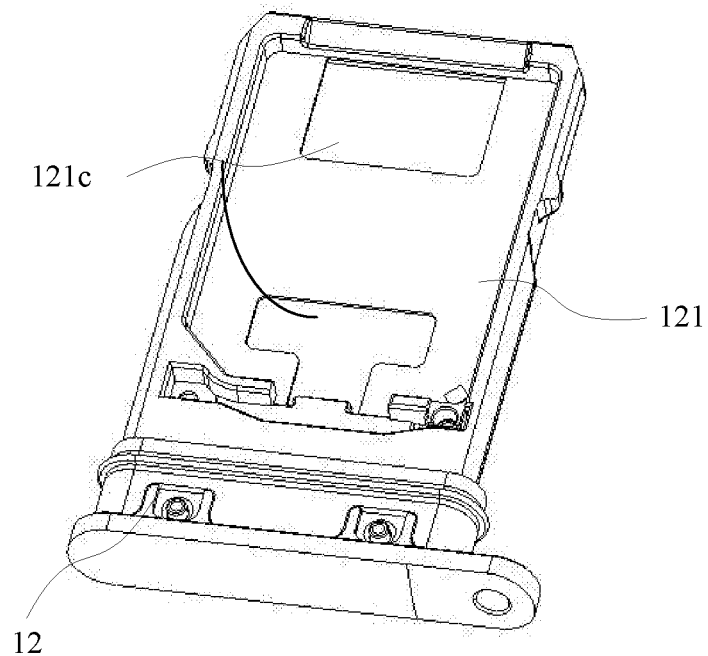
FIG. 17 is still another schematic structural diagram of a card tray according to the present invention.

Because the formed groove bottom of the recess portion 121 is usually formed by a metal baseboard, to prevent an end of the electrical connector 2 from touching the metal baseboard and causing a short circuit, the metal baseboard of the recess portion 121 may be further disposed with a hollow avoidance area. FIG. 16 is another schematic structural diagram of the card tray according to the present invention. As shown in FIG. 16, the bottom of the recess portion 121 of the card tray is usually a metal baseboard, and a position of a corresponding electrical connector on the metal baseboard is disposed with a hollow area 121*c*. The hollow area 121*c* may include a "T"-shaped area and a rectangular area. The two areas correspond to positions of different electrical connectors. In this way, the card tray is inserted into the card slot, an end of the electrical connector is located in the hollow area 121c, thereby preventing contact with the metal baseboard and a short circuit, and the metal baseboard has sufficient strength to support the card tray in causing no deformation. FIG. 17 is still another schematic structural diagram of the card tray according to the present invention. As shown in FIG. 17, a part of the hollow area 121c disposed at the bottom of the recess portion 121 of the card tray is in communication with an edge of the recess portion 121. In this way, an area of the hollow area 121c is larger, and a layout range of the electrical connector is wider.

In this embodiment, the card holder specifically includes the holder body and the plurality of electrical connectors. The holder body is disposed with the card slot whose shape and size both match the nano SIM card. The card slot is configured to accommodate the nano SIM card or the memory card having the same appearance as the nano SIM card. The at least some of the plurality of electrical connectors are the first connectors whose positions match the positions of the electrical contact points in the nano SIM card, and the first electrical connector is configured to electrically connect to the nano SIM card or the memory card accommodated in the card slot. The plurality of electrical connectors are all configured to electrically connect to the memory card. In this way, the card holder can be configured to accommodate the nano SIM card, and the card holder can also use the same card slot to accommodate the memory card having the shape similar to that of the nano SIM card, to implement data expansion and data transmission. The card holder has relatively good expandability.

Embodiment 2 of this application further provides a card tray, configured to carry a SIM card, a nano SIM card, various types of memory cards configured to store data, and the like. The card tray has a recess portion, and to secure and locate a SIM card, a nano SIM card, an SD card, a micro SD card, or another memory card placed in the recess portion, at least one elastic clamping member protruding toward an inner side of the recess portion is disposed on an inner wall of the recess portion. In this way, the elastic clamping member can secure various types of cards placed in the recess portion, to prevent the card from falling out from the card tray. Specifically, a securing principle and structure of the elastic clamping member are similar to those in Embodiment 1, and details are not described herein again.

There are usually a plurality of elastic clamping members that can be arranged along a circumferential direction of the recess portion, to improve a securing effect.

A SIM card, a micro SIM card, a nano SIM card, an SD card, a micro SD card, another memory card having a shape similar to that of the foregoing card, and the like can be placed in the card tray, and correspondingly, a shape of the recess portion of the card tray usually also matches the shape of the card, to approximately locate and secure the card.

When a nano SIM card or a memory card having a shape similar to that of a nano SIM card is placed in the card tray, a shape and a structure of the card tray may match the card slot of the card holder in Embodiment 1, for example, as shown in FIG. 13.

The recess portion may have a plurality of forms, for example, the recess portion may be enclosed by a frame-shaped structure and a baseboard. Usually, to ensure structural strength, the baseboard is usually made of metal. In this case, to prevent an electrical connector in a card holder from coming into contact with the baseboard and causing a short circuit, the baseboard of the recess portion of the card tray may be further disposed with at least two hollow avoidance areas, and the avoidance area corresponds to a position of the electrical connector in the card holder. In this way, when the card tray is inserted into the card slot, an end of the electrical connector in the card holder is located in the avoidance area, to be staggered from the baseboard, and avoid a short circuit. Specifically, the avoidance area may have different shapes, for example, a "T" shape or a rectangle.

Optionally, to place two or more SIM cards, nano SIM cards, or memory cards, or the like, the card tray may have two recess portions disposed opposite to each other, openings of the two recess portions are away from each other, and the two recess portions may share a baseboard. A specific form of the card tray may be similar to the card tray in FIG. 13, FIG. 16, and FIG. 17, and details are not described herein again.

Figure 18:
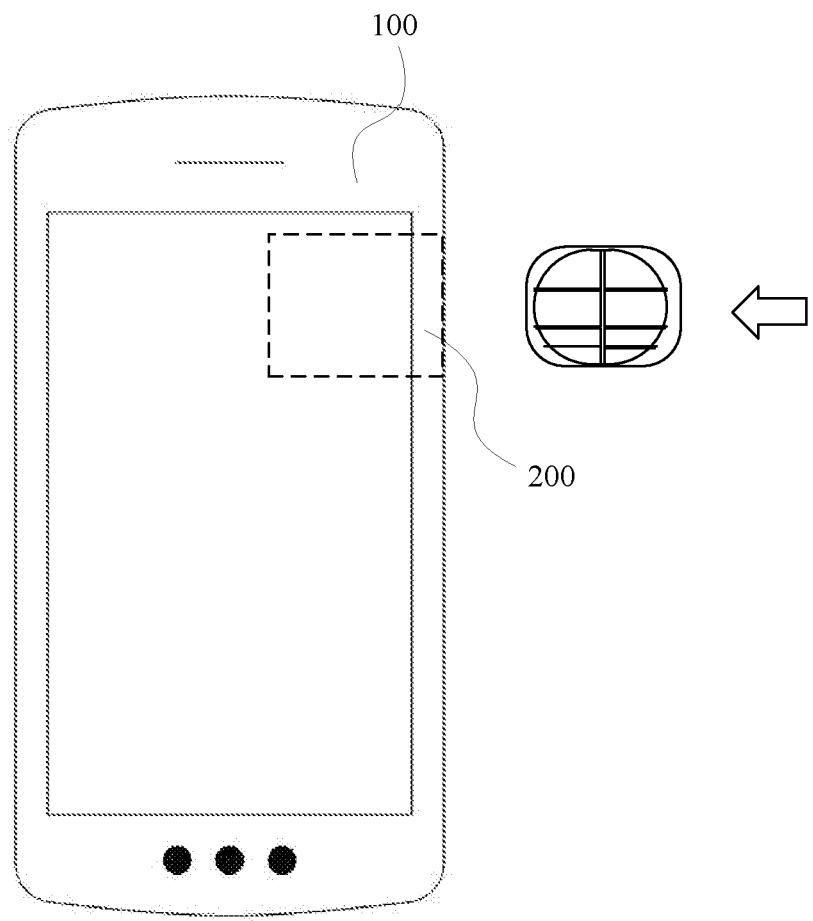
FIG. 18 is a schematic structural diagram of a mobile terminal according to Embodiment 3 of this application.

FIG. 18 is a schematic structural diagram of a mobile terminal according to Embodiment 3 of this application. As shown in FIG. 18, the mobile terminal 100 provided in this embodiment specifically includes the card holder 200 in Embodiment 1, and the card holder 200 is configured to accommodate at least one of a memory card or a nano SIM card. A specific function, structure, and working principle of the card holder 200 are all already described in detail in Embodiment 1, and details are not described herein again.

The mobile terminal 100 in this embodiment of this application may include a mobile phone, a tablet computer, a personal digital assistant (PDA), a point of sales (POS), an in-vehicle computer, and the like.

Figure 19:
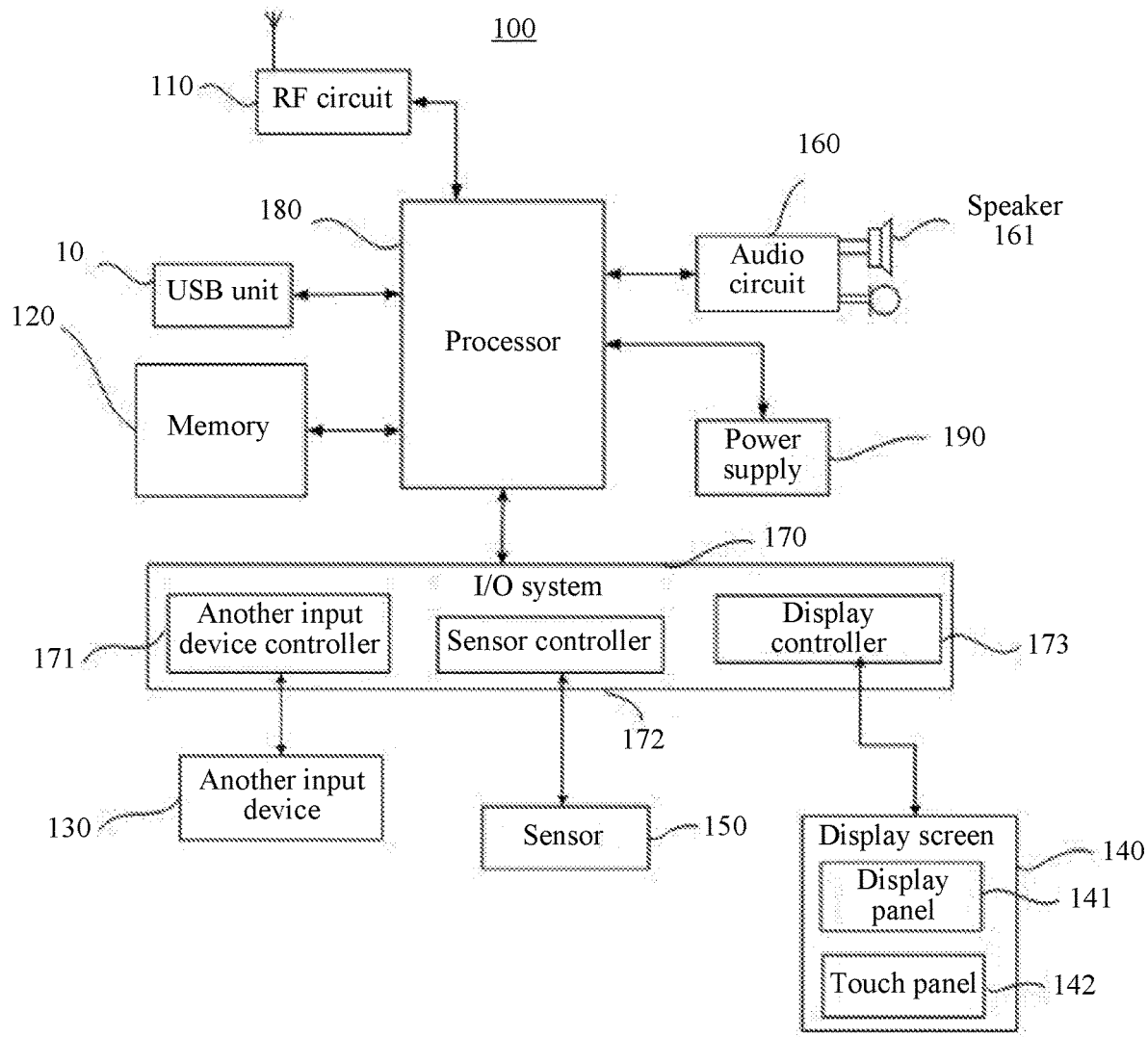
FIG. 19 is a block diagram of an internal partial structure when the mobile terminal in FIG. 18 is a mobile phone.

An example in which the mobile terminal 100 is a mobile phone is used. FIG. 19 is a block diagram of an internal partial structure when the mobile terminal in FIG. 18 is a mobile phone. As shown in FIG. 19, the mobile terminal 100 includes components such as a radio frequency (RF) circuit 110, a memory 120, another input device 130, a display screen 140, a sensor 150, an audio circuit 160, an I/O subsystem 170, a processor 180, and a power supply 190. A person skilled in the art may understand that the structure of the mobile phone shown in FIG. 19 does not constitute a limitation to the mobile phone, and the mobile phone may include more components or fewer components than those shown in the figure, or some components may be combined, or some components may be split, or a different component deployment may be used. A person skilled in the art may understand that the display screen 140 is a user interface (UI), and the mobile terminal 100 may include more user interfaces or fewer user interfaces than those shown in the figure.

Components of the mobile terminal 100 are described in detail below with reference to FIG. 19.

The RF circuit 110 may be configured to receive and send information or receive and send a signal during a call. Particularly, the RF circuit receives downlink information from a base station, then delivers the downlink information to the processor 180 for processing, and sends related uplink data to the base station. Usually, the RF circuit includes, but is not limited to, an antenna, at least one amplifier, a transceiver, a coupler, a low noise amplifier (LNA), a duplexer, and the like. In addition, the RF circuit 110 may further communicate with a network and another device through wireless communication. The wireless communication may use any communication standard or protocol, including, but not limited to, a global system for mobile communications (GSM), a general packet radio service (GPRS), code division multiple access (CDMA), wideband code division multiple access (WCDMA), long term evolution (LTE), an e-mail, a short messaging service (SMS), and the like.

The memory 120 may be configured to store a software program and a module, and the processor 180 runs the software program and the module that are stored in the memory 120, to perform various functional applications and data processing of the mobile terminal 100. The memory 120 may mainly include a program storage area and a data storage area. The program storage area may store an operating system, an application program required by at least one function (such as a sound playback function and an image display function), and the like. The data storage area may store data (such as audio data and an address book) created according to use of the mobile terminal 100, and the like. In addition, the memory 120 may include a high-speed random access memory, and may further include a non-volatile memory, such as at least one magnetic disk storage device, a flash memory device, or another volatile solid-state storage device.

The other input device 130 may be configured to receive input digit or character information, and generate a key signal input related to user setting and function control of the mobile terminal 100. Specifically, the other input device 130 may include, but is not limited to, one or more of a physical keyboard, a functional key (for example, a volume control key or a power on/off key), a trackball, a mouse, a joystick, or an optical mouse (the optical mouse is a touch-sensitive surface that does not display visible output, or an extension of a touch-sensitive surface formed by a touchscreen). The other input device 130 is connected to another input device controller 171 in the I/O subsystem 170, and exchanges a signal with the processor 180 under control of the other device input controller 171.

The display screen 140 may be configured to display information entered by the user or information provided for the user, and various menus of the mobile terminal 100, and may further accept user input. Specifically, the display screen 140 may include a display panel 141 and a touch panel 142. The display panel 141 may be configured by using an LCD (Liquid Crystal Display, liquid crystal display), an OLED (Organic Light Emitting Diode, organic light-emitting diode), or the like. The touch panel 142 is also referred to as a touchscreen, a touch-sensitive screen, or the like, and may collect a touch operation or non-touch operation of a user on or near the touch panel (such as an operation of the user on the touch panel 142 or near the touch panel 142 by using any suitable object or accessory such as a finger or a stylus, or including a motion sensing operation including operation types such as an isolated control operation and a multipoint control operation), and drives a corresponding connection apparatus according to a preset program. Optionally, the touch panel 142 may include two parts: a touch detection apparatus and a touch controller. The touch detection apparatus detects a touch position and a gesture of the user, detects a signal generated by the touch operation, and transfers the signal to the touch controller. The touch controller receives touch information from the touch detection apparatus, converts the touch information into information that can be processed by the processor and sends the information to the processor 180, and can receive a command sent by the processor 180 and execute the command. In addition, the touch panel 142 may be a resistive, capacitive, infrared, or surface sound wave type touch panel, or the touch panel 142 may be implemented by using any technology to be developed in the future. Further, the touch panel 142 may cover the display panel 141. The user may perform, according to content displayed on the display panel 141 (where the displayed content includes but is not limited to a soft keyboard, a virtual mouse, a virtual key, an icon, or the like), an operation on or near the touch panel 142 covering the display panel 141. After detecting the touch operation on or near the touch panel 142, the touch panel 142 transfers the touch operation to the processor 180 by using the I/O subsystem 170 to determine a type of a touch event, to determine a user input. Subsequently, the processor 180 provides a corresponding visual output on the display panel 141 according to the type of the touch event and according to the user input by using the I/O subsystem 170. Although in FIG. 19, the touch panel 142 and the display panel 141 are used as two separate parts to implement input and output functions of the mobile terminal 100, in some embodiments, the touch panel 142 and the display panel 141 may be integrated to implement the input and output functions of the mobile terminal 100.

The mobile terminal 100 may further include at least one sensor 150 such as an optical sensor, a motion sensor, and other sensors. Specifically, the optical sensor may include an ambient light sensor and a proximity sensor. The ambient light sensor may adjust luminance of the display panel 141 based on brightness of the ambient light. The proximity sensor may switch off the display panel 141 and/or backlight when the mobile terminal 100 is moved to the ear. As one type of motion sensor, an acceleration sensor may detect magnitude of accelerations in various directions (usually, tri-axial), can detect magnitude and a direction of the gravity when the terminal 100 is static, and may be applied to an application that recognizes the attitude of a mobile phone (for example, switching between landscape orientation and portrait orientation, a related game, and magnetometer gesture calibration), and functions related to vibration recognition (such as a pedometer and tapping), and the like. As for other sensors such as a gyroscope, a barometer, a hygrometer, a thermometer, and an infrared sensor that may be further configured for the mobile terminal 100, details are not described herein.

The audio circuit 160, the speaker 161, and the microphone 162 may provide audio interfaces between the user and the mobile terminal 100. The audio circuit 160 may convert received audio data into a signal and transmit the signal to the speaker 161. The speaker 161 converts the signal into a sound signal for output. On the other hand, the microphone 162 converts a collected sound signal into a signal. The audio circuit 160 receives the signal and converts the signal into audio data, and outputs the audio data to the RF circuit 108 to send the audio data to, for example, another mobile phone, or outputs the audio data to the memory 120 for further processing.

The I/O subsystem 170 is configured to control input and output peripheral devices, and may include the other device input controller 171, a sensor controller 172, and a display controller 173. Optionally, one or more another input control device controllers 171 receive a signal from the other input device 130 and/or send a signal to the other input device 130. The another input device 130 may include a physical button (a pressing button, a rocker button, and the like), a dial pad, a slider switch, a joystick, a click scroll wheel, or an optical mouse (the optical mouse is a touch-sensitive surface that does not display a visible output, or an extension of a touch-sensitive surface formed by a touchscreen). It should be noted that, the other input control device controller 171 may be connected to any one or more of the foregoing devices. The display controller 173 in the I/O subsystem 170 receives a signal from the display screen 140 and/or sends a signal to the display screen 140. After the display screen 140 detects the user input, the display controller 173 converts the detected user input into interaction with a user interface object displayed on the display screen 140. To be specific, man-machine interaction is implemented. The sensor controller 172 may receive a signal from one or more sensors 150 and/or may send a signal to the one or more sensors 150.

The processor 180 is the control center of the mobile terminal 100, and is connected to various parts of the mobile phone by using various interfaces and lines. By running or executing the software program and/or module stored in the memory 120, and invoking data stored in the memory 120, the processor 180 performs various functions and data processing of the mobile terminal 100, thereby performing overall monitoring on the mobile phone. Optionally, the processor 180 may include one or more processing units. Preferably, the processor 180 may integrate an application processor and a modem processor. The application processor mainly processes an operating system, a user interface, an application program, and the like. The modem processor mainly processes wireless communication. It may be understood that the foregoing modem processor may alternatively not be integrated into the processor 180.

The mobile terminal 100 further includes the power supply 190 (such as a battery) for supplying power to the components. Preferably, the power supply may be logically connected to the processor 180 by using a power management system, thereby implementing functions such as charging, discharging, and power consumption management by using the power management system.

Although not shown in the figure, the mobile terminal 100 may further include a camera, a Bluetooth module, and the like, and details are not described herein again.

In the mobile terminal 100 in this embodiment, a nano SIM card and a memory card are connected and data is transmitted by using the card holder 200, to implement functions such as user identification, data transmission, and data expansion. The card holder 200 may be configured to install the nano SIM card, and may also be configured to install the memory card, and can establish a normal electrical connection and implement data transmission with the nano SIM card or the memory card, thereby ensuring normal use of the nano SIM card or the memory card.

Because a contact point in the memory card is also used to establish an electrical connection, for ease of description, that the contact point in the memory card and an electrical contact point in the nano SIM card are considered as a same type of electrical contact points is described below. In an optional implementation, the mobile terminal 100 may further include an identification circuit and a switching circuit (not shown). The identification circuit and the switching circuit are both electrically connected to the card holder 200. The switching circuit is configured to: when at least two electrical connectors matching a same electrical contact point in the memory card or the nano SIM card exists in card holder 200, switch the identification circuit to an SIM card identification mode; or when electrical connectors in the card holder 200 match electrical contact points in a one-to-one manner, switch the identification circuit to a memory card identification mode.

Specifically, there is particular data or information in both the nano SIM card and the memory card, so that both the nano SIM card and the memory card can be considered as information cards for establishing a data connection to and exchanging information with the card holder 200. Because the nano SIM card and the memory card respectively have different functions, the mobile terminal 100 needs to distinguish a type of the information card in the card holder 200, and different identification modes are switched between each other corresponding to different information cards.

Specifically, a quantity of electrical contact points in the memory card is different from a quantity of electrical contact points in the nano SIM card, and the quantity of electrical contact points in the memory card is greater than the quantity of electrical contact points in the nano SIM card. Therefore, when a card inserted into the card holder 200 is a nano SIM card, two or more electrical connectors are always correspondingly connected to a same electrical contact point in the information card. In this case, the switching circuit can detect an electrical signal status of each electrical connector, to determine that two or more electrical connectors are connected to a same electrical contact point, thereby learning that the information card in the card holder 200 is the nano SIM card. In this way, the identification circuit can be switched to the SIM card identification mode to identify the card.

Otherwise, when the electrical connectors are all correspondingly connected to different electrical contact points, the switching circuit may detect an electrical signal on the electrical connector to learn that the information card accommodated in the card holder 200 is a memory card, so that the identification circuit can be switched to the memory card identification mode, to establish a connection and perform data transmission. In this way, the mobile terminal can distinguish the information card inserted into the card slot of the card holder, thereby establishing a correct connection and performing data transmission.

The switching circuit and the identification circuit in the mobile terminal 100 may be disposed in the processor of the mobile terminal or another circuit. Details are not described herein again.

In this embodiment, the mobile terminal specifically includes the card holder. The card holder is configured to accommodate at least one of the memory card or the nano SIM card. The card holder specifically includes the holder body and the plurality of electrical connectors. The holder body is disposed with the card slot whose shape and size both match the nano SIM card. The card slot is configured to accommodate the nano SIM card or the memory card having the same appearance as the nano SIM card. The at least some of the plurality of electrical connectors are the first connectors whose positions match the positions of the electrical contact points in the nano SIM card, and the first electrical connector is configured to electrically connect to the nano SIM card or the memory card accommodated in the card slot. The plurality of electrical connectors are all configured to electrically connect to the memory card. In this way, the mobile terminal can use both the nano SIM card and the memory card having the shape similar to that of the nano SIM card, to implement data expansion and data transmission. The mobile terminal has relatively good expandability.

Figure 20:
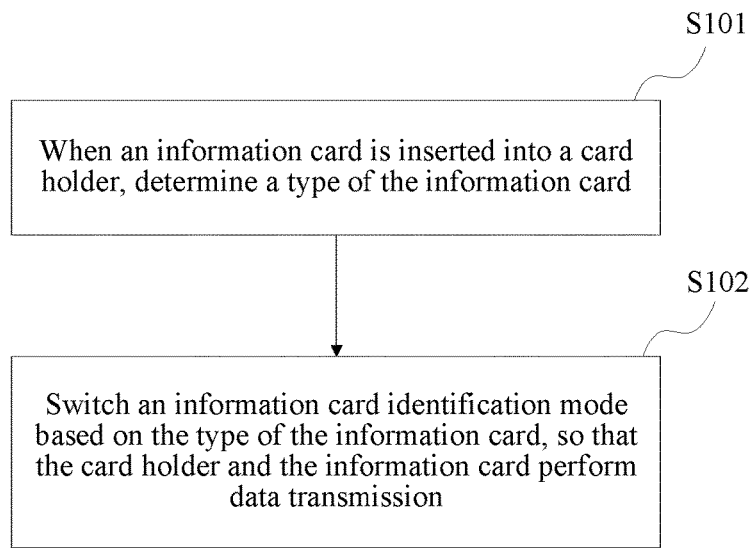
FIG. 20 is a schematic flowchart of an information identification method according to Embodiment 4 of this application.

FIG. 20 is a schematic flowchart of an information identification method according to Embodiment 4 of this application. The information identification method in this embodiment may be applied to a mobile device connected to the card holder in Embodiment 1 or the mobile terminal in Embodiment 2. The information card accommodated in the card holder in Embodiment 1 and Embodiment 2 is identified, to determine a nano SIM card or a memory card in the card holder, and perform a corresponding data operation. Specifically, as shown in FIG. 20, the information identification method provided in this embodiment may specifically include the following steps.

S101: When an information card is inserted into the card holder, determine a type of the information card.

Because the card holder in Embodiment 1 or Embodiment 2 has the card slot matching the shape of the nano SIM card, both the nano SIM card and the memory card having the shape similar to that of the nano SIM card can be inserted into the card slot. In this way, the type of the information card in the card slot needs to be determined and identified, so that the card holder or the mobile terminal performs a corresponding data connection function.

S102: Switch an information card identification mode based on the type of the information card, so that the card holder and the information card perform data transmission.

After the type of the information card is obtained, a card holder identification mode can be correspondingly switched based on the type of the information card, so that the card holder establishes a data connection and transmits data to the information card based on a corresponding electrical connection relationship and interface specification. Specifically, when the information card in the card slot is the memory card, the card holder is connected by using the memory card identification mode. In this case, a circuit configured to identify the information card and transmit data is switched to a circuit applicable to a memory card connection specification. Parameters such as an interface definition and an interface voltage of the circuit are all applicable to a micro SD card, an SD card, or the like. When the information card in the card slot is the nano SIM card, the card holder is connected by using the SIM card identification mode. In this case, a circuit configured to identify the information card is switched to a circuit dedicated for connecting to the SIM card. Parameters such as an interface definition and an interface voltage of the circuit are in a one-to-one correspondence with electrical contact points in the nano SIM card, to read and identify the nano SIM card.

Figure 21:
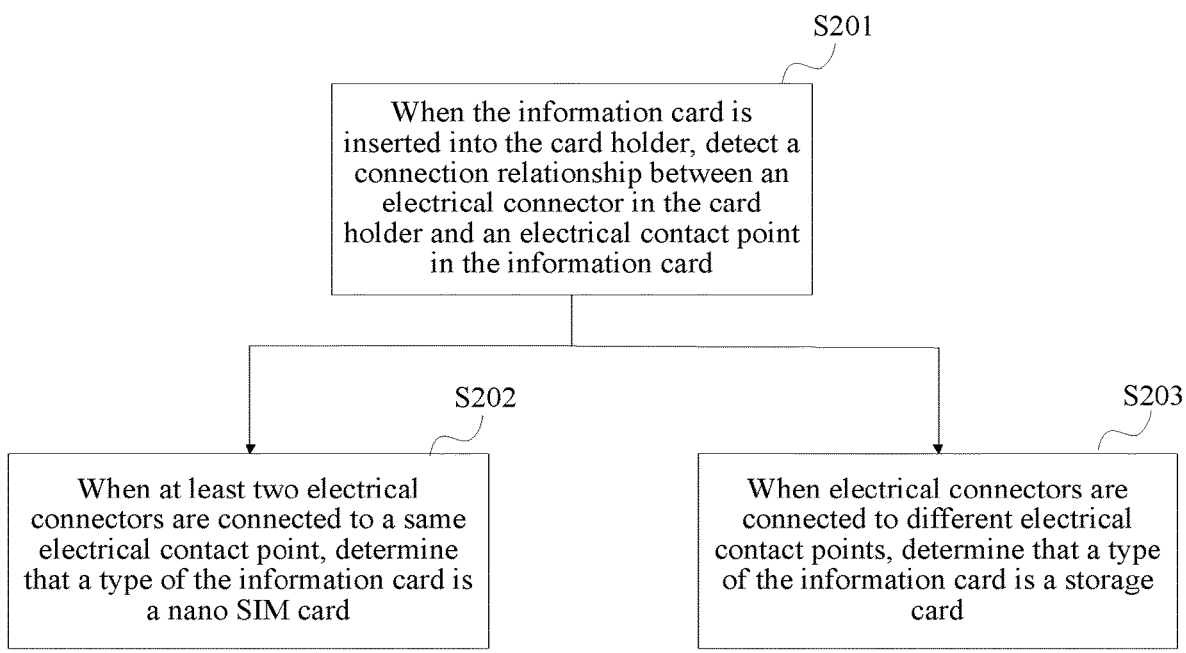
FIG. 21 is a schematic flowchart of determining a type of an information card according to Embodiment 4 of this application.

FIG. 21 is a schematic flowchart of determining the type of the information card according to Embodiment 4 of this application. As shown in FIG. 21, optionally, when the type of the information card is determined, the following specific steps may be used.

S201: When the information card is inserted into the card holder, detect a connection relationship between an electrical connector in the card holder and an electrical contact point in the information card.

Because the contact point in the memory card is also used to establish an electrical connection, for ease of description, that the contact point in the memory card and the electrical contact point in the nano SIM card are considered as a same type of electrical contact points is described below. Because the nano SIM card and the memory card have different quantities of electrical contact points, when different types of information cards are accommodated in the card slot of the card holder, the electrical connectors in the card holder correspond to different electrical contact points to implement contact and establish a connection, and the electrical connectors are correspondingly connected to a same electrical contact point or different electrical contact points in the information card. The following step S202 or step S203 may be correspondingly performed below based on different connection statuses of the electrical connectors, to determine the type of the information card.

S202: When at least two electrical connectors are connected to a same electrical contact point, determine that the type of the information card is a nano SIM card.

S203: When the electrical connectors are connected to different electrical contact points, determine that the type of the information card is a memory card.

Because the card holder needs to be applicable to connections of both the nano SIM card and the memory card, the card holder needs to have sufficient electrical connectors, for connecting to the information card. In this case, matching between a quantity of electrical connectors and a quantity of electrical contact points in an information card having a relatively large quantity of electrical contact points should be maintained.

In this way, when two or more electrical connectors are connected to a same electrical contact point in the information card, it indicates that the quantity of electrical contact points in the information card is less than the quantity of electrical connectors in the card holder. In this case, it may be determined that the information card installed in the card slot is a nano SIM card having a relatively small quantity of electrical contact points. When the electrical connectors in the card holder are in a one-to-one correspondence with the electrical contact points in the information card, it indicates that an information card having a relatively large quantity of electrical contact points, namely, a memory card, exists in the card slot.

In this embodiment, the information identification method may specifically include the following steps: when the information card is inserted into the card holder, first determining the type of the information card; and then switching the identification mode of the card holder for the information card based on the type of the information card, so that the card holder and the information card perform data transmission. In this way, a nano SIM card or a memory card may be inserted into a same card holder and corresponding identification is performed, to implement user identification or data expansion. The information identification method has relatively good expandability.

What is claimed is:

1. A mobile terminal, comprising a card holder, wherein the card holder is configured to accommodate at least one of a memory card or a nano SIM card;
   wherein the card holder comprises a holder body and a plurality of electrical connectors, wherein the holder body is disposed with a card slot matching a nano SIM card; the card slot is configured to accommodate the nano SIM card or a memory card having a same appearance as the nano SIM card and the plurality of electrical connectors in the card holder are first electrical connectors;
   wherein the first electrical connectors are configured to electrically connect to contact points in the memory card in a one-to-one correspondence when the memory card is in the card slot;
   wherein positions of at least two first electrical connectors match a position of a same electrical contact point in the nano SIM card when the nano SIM card is in the card slot; and
   wherein the mobile terminal further comprises an identification circuit and a switching circuit, the identification circuit and the switching circuit are electrically connected to the card holder, the switching circuit is configured to: switch the identification circuit to an SIM card identification mode when the at least two first electrical connectors match the same electrical contact point of a card in the cardholder; or switch the identification circuit to a memory card identification mode when the first electrical connectors in the card holder match the contact points of a card in the cardholder in a one-to-one manner.

2. The mobile terminal according to claim 1, wherein the at least two of the first electrical connectors correspond to different contact points in the memory card.

3. The mobile terminal according to claim 1, wherein the first electrical connectors comprise at least two electrical connector assemblies.

4. The mobile terminal according to claim 3, wherein each electrical connector assembly comprises two first electrical connectors matching a position of a same electrical contact point on the nano SIM card.

5. The mobile terminal according to claim 3, wherein the at least two electrical connector assemblies comprise a first electrical connector assembly and a second electrical connector assembly; each first electrical connector in the first electrical connector assembly matches a position of a VCC contact point in the nano SIM card; and each first electrical connector in the second electrical connector assembly matches a position of a GND contact point in the nano SIM card.

6. The mobile terminal according to claim 3, wherein the first electrical connectors in the at least two electrical connector assemblies are arranged in different manners; and/or
each electrical connector assembly includes a first electrical connector whose shape is different from a shape of a first electrical connector outside the electrical connector assembly.

7. The mobile terminal according to claim 1, wherein each of the first electrical connectors is a spring.

8. The mobile terminal according to claim 1, wherein the holder body comprises an accommodation cavity; the card holder comprises a card tray inserted in the accommodation cavity; the card tray comprises a recess portion for accommodating the nano SIM card; and the recess portion forms at least a partial inner wall of the card slot.

9. The mobile terminal according to claim 8, wherein the card tray comprises one recess portion, and a length direction of the recess portion is parallel or perpendicular to an insertion direction of the card tray.

10. The mobile terminal according to claim 8, wherein the card tray comprises at least two recess portions for accommodating the nano SIM card, and the recess portions are spaced along an insertion direction of the card tray.

11. The mobile terminal according to ef claim 8, wherein at least one elastic clamping member protruding toward an inner side of the recess portion is disposed on an edge of the recess portion.

12. The mobile terminal according to claim 11, wherein the at least one elastic clamping member is a plastic protrusion.

13. A mobile terminal, comprising a card holder, wherein the card holder is configured to accommodate at least one of a memory card or a nano SIM card;
wherein the card holder comprises a holder body and a plurality of electrical connectors, wherein the holder body is disposed with a card slot matching a nano SIM card; the card slot is configured to accommodate the nano SIM card or a memory card having a same appearance as the nano SIM card and the plurality of electrical connectors in the card holder are first electrical connectors;
wherein the first electrical connectors are configured to electrically connect to contact points in the memory card in a one-to-one correspondence with the contact points in the memory card when the memory card is in the card slot;
wherein positions of the at least two first electrical connectors match a position of a same electrical contact point in the nano SIM card when the nano SIM card is in the card slot; and
the mobile terminal further comprises at least one processor and a memory communicatively coupled to the at least one processor, wherein the memory is stored with instructions executable by the at least one processor, the instructions are executed by the at least one processor to cause the at least one processor to:
determine that a type of a card in the cardholder is the nano SIM card when the at least two first electrical connectors are connected to the same electrical contact point of the card in the cardholder; and
determine that the type of the card in the cardholder is the memory card when the electrical connectors are connected to electrical contact points of the card in the cardholder in a one-to-one manner.

\* \* \* \* \*

UNITED STATES PATENT AND TRADEMARK OFFICE
CERTIFICATE OF CORRECTION

| | |
|---|---|
| PATENT NO. | : 11,581,673 B2 |
| APPLICATION NO. | : 16/969627 |
| DATED | : February 14, 2023 |
| INVENTOR(S) | : Shihao Zhang et al. |

It is certified that error appears in the above-identified patent and that said Letters Patent is hereby corrected as shown below:

In the Claims

In Column 28, Line 57, in Claim 1, delete "cardholder;" and insert -- card holder; --.

In Column 28, Line 60, in Claim 1, delete "cardholder" and insert -- card holder --.

In Column 29, Line 37, in Claim 11, after "to" delete "ef".

In Column 30, Line 31, in Claim 13, delete "cardholder" and insert -- card holder --.

In Column 30, Line 34, in Claim 13, delete "cardholder;" and insert -- card holder; --.

In Column 30, Line 35, in Claim 13, delete "cardholder" and insert -- card holder --.

In Column 30, Line 38, in Claim 13, delete "cardholder" and insert -- card holder --.

Signed and Sealed this
Eighteenth Day of April, 2023

Katherine Kelly Vidal
*Director of the United States Patent and Trademark Office*